US008510187B1

(12) United States Patent
Dinamani et al.

(10) Patent No.: US 8,510,187 B1
(45) Date of Patent: Aug. 13, 2013

(54) INTELLIGENT TAX REFUND ALLOCATION

(75) Inventors: Vidya Dinamani, San Diego, CA (US);
Alan Tifford, San Diego, CA (US);
Richard N. Preece, San Marcos, CA
(US); David D. Taylor, San Marcos, CA
(US)

(73) Assignee: Intuit Inc., Mountain View, CA (US)

( * ) Notice: Subject to any disclaimer, the term of this
patent is extended or adjusted under 35
U.S.C. 154(b) by 321 days.

(21) Appl. No.: 12/709,345

(22) Filed: Feb. 19, 2010

(51) Int. Cl.
*G06F 17/22* (2006.01)
*G07F 19/00* (2006.01)

(52) U.S. Cl.
USPC ............................................................ 705/31

(58) Field of Classification Search
USPC ............................................................ 705/31
See application file for complete search history.

(56) References Cited

U.S. PATENT DOCUMENTS

| | | | | |
|---|---|---|---|---|
| 4,890,228 A * | 12/1989 | Longfield | ........................ | 705/31 |
| 5,193,057 A * | 3/1993 | Longfield | ........................ | 705/31 |
| 5,724,523 A * | 3/1998 | Longfield | ........................ | 705/35 |
| 5,963,921 A * | 10/1999 | Longfield | ........................ | 705/31 |
| 6,202,052 B1 * | 3/2001 | Miller | ............................. | 705/31 |
| 6,430,542 B1 * | 8/2002 | Moran | ........................ | 705/36 R |
| 7,010,507 B1 * | 3/2006 | Anderson et al. | ................ | 705/31 |
| 7,177,829 B1 * | 2/2007 | Wilson et al. | .................... | 705/31 |
| 7,539,635 B1 * | 5/2009 | Peak et al. | ........................ | 705/31 |
| 7,565,312 B1 * | 7/2009 | Shaw et al. | ....................... | 705/31 |
| 7,668,764 B2 * | 2/2010 | Wilson | ............................. | 705/31 |
| 7,765,132 B2 * | 7/2010 | Wilson et al. | .................... | 705/30 |
| 7,778,894 B2 * | 8/2010 | Monsor et al. | ................... | 705/31 |
| 8,019,667 B1 | 9/2011 | Bent et al. | | |
| 8,036,959 B2 | 10/2011 | Abeles | | |
| 2001/0037268 A1 * | 11/2001 | Miller | ............................. | 705/31 |
| 2001/0037275 A1 * | 11/2001 | Johnson et al. | ................. | 705/36 |
| 2002/0013747 A1 * | 1/2002 | Valentine et al. | ............... | 705/31 |
| 2002/0111946 A1 * | 8/2002 | Fallon | .............................. | 707/9 |
| 2003/0014358 A1 * | 1/2003 | Agee et al. | ....................... | 705/39 |
| 2003/0055754 A1 * | 3/2003 | Sullivan | .......................... | 705/31 |
| 2003/0061131 A1 * | 3/2003 | Parkan, Jr. | ....................... | 705/30 |
| 2003/0101111 A1 * | 5/2003 | Dang et al. | ....................... | 705/31 |
| 2004/0199467 A1 * | 10/2004 | Martin et al. | .................... | 705/43 |
| 2004/0215560 A1 * | 10/2004 | Amalraj et al. | .................. | 705/40 |
| 2005/0108154 A1 | 5/2005 | McLiesh et al. | | |
| 2006/0111990 A1 * | 5/2006 | Cohen et al. | ..................... | 705/32 |

(Continued)

OTHER PUBLICATIONS

Non-Final Office Action dated Feb. 2, 2012 in U.S. Appl. No. 12/709,366, filed Feb. 19, 2010, Inventor: Vidya Dinamani (16 pages).

(Continued)

*Primary Examiner* — Seye Iwarere
(74) *Attorney, Agent, or Firm* — Vista IP Law Group LLP

(57) ABSTRACT

A tax refund amount is determined or received at an intermediate computer operably connected to tax authority and user computers. The user computer and a tax preparation program are used to prepare an electronic tax return and determine the refund amount. Accounts that are available to receive a portion of the refund are identified and selected. A determination regarding how the refund can be allocated to selected accounts is made. The refund is transferred from the tax authority to the intermediate computer, and respective portions of the refund are transferred from the intermediate computer to respective selected accounts based at least in part upon a determined or selected allocation to increase the value of the refund, e.g., due to interest rates of selected accounts, compared to the refund value determined with the tax preparation program.

27 Claims, 16 Drawing Sheets

(56) References Cited

U.S. PATENT DOCUMENTS

| | | | |
|---|---|---|---|
| 2006/0218095 A1* | 9/2006 | Wilson | 705/40 |
| 2006/0235776 A1* | 10/2006 | Temme | 705/31 |
| 2006/0242045 A1 | 10/2006 | Muldowney | |
| 2007/0136160 A1* | 6/2007 | Wilson et al. | 705/31 |
| 2007/0233596 A1* | 10/2007 | Ambrose, Jr. | 705/38 |
| 2008/0147494 A1* | 6/2008 | Larson | 705/14 |
| 2008/0189205 A1* | 8/2008 | McKernan et al. | 705/39 |
| 2008/0195554 A1* | 8/2008 | Sandhu et al. | 705/36 R |
| 2009/0132399 A1* | 5/2009 | Pavlou et al. | 705/31 |
| 2009/0210342 A9* | 8/2009 | Wilson | 705/40 |
| 2009/0287591 A1* | 11/2009 | Wyle et al. | 705/31 |
| 2009/0319427 A1* | 12/2009 | Gardner et al. | 705/44 |
| 2010/0036760 A1* | 2/2010 | Abeles et al. | 705/31 |

OTHER PUBLICATIONS

Amendment dated Apr. 27, 2012, Final Office Action dated Jun. 29, 2012 and Amendment dated Aug. 29, 2012 in U.S. Appl. No. 12/709,366, filed Feb. 19, 2010, (54 pages).

* cited by examiner

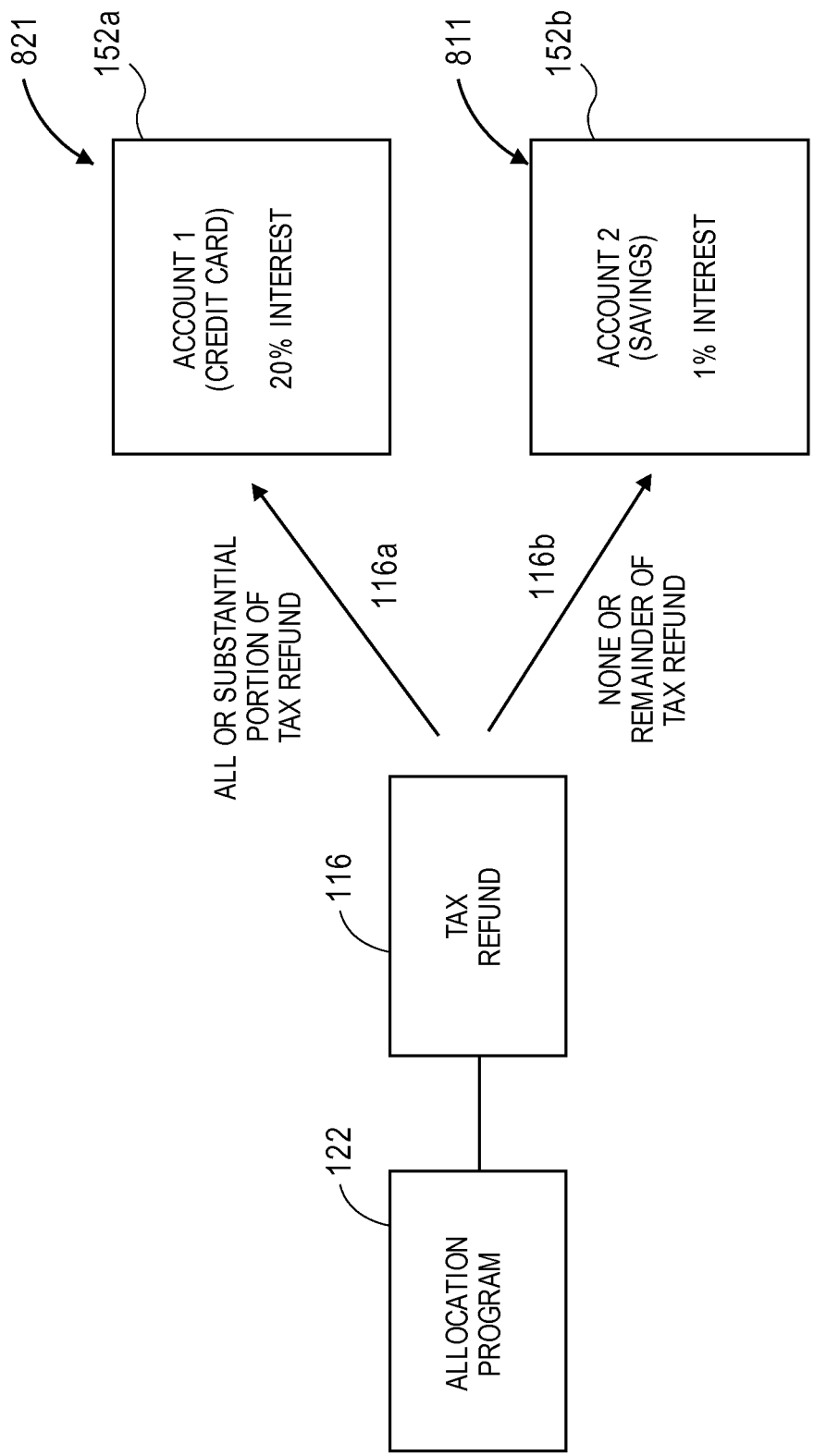

INTELLIGENT TAX REFUND ALLOCATION

BACKGROUND

The invention relates to finance applications or programs such as tax preparation and personal finance programs that may be utilized to prepare electronic tax returns and manage personal finances. Examples of known tax preparation programs that are include Turbo Tax®, ProSeries® and Lacerte® tax preparation programs, which are consumer and professional tax preparation programs available from Intuit Inc., Mountain View, Calif., H&R Block TaxCut software, available from H&R Block, Inc., Kansas City, Mo., and TaxACT® software, available from $2^{nd}$ Story Software, Inc. TurboTax®, ProSeries® and Lacerte® are registered trademarks of Intuit Inc., and TaxACT® is a registered trademark of $2^{nd}$ Story Software, Inc. Examples of known desktop and on-line personal finance programs include Quicken®, FinanceWorks® and Mint.com, Microsoft Money, which is available from Microsoft Corporation, Redmond, Wash. and other personal finance programs including wasabe.com. Quicken® and FinanceWorks® are registered trademarks of Intuit Inc.

Tax preparation programs have become very popular and allow a user, taxpayer or tax professional to prepare an electronic tax return and electronically file the return using a computer. Financial and personal information to be included in the electronic tax return can be manually entered by the user by answering questions presented in a series of interview screens. Information can also be imported from another program such as a personal finance program. The tax preparation program is operable to determine whether the user will receive a refund or owes additional taxes. In cases in which the user is entitled to a refund, the user is typically presented with options of receiving the refund from a tax authority in the form of a check that is mailed to an address in the electronic tax return or as an electronic deposit to a specific account identified by account number and routing number in the electronic tax return. If the user owes additional taxes, the user may pay the tax owed by, for example, sending a check to the tax authority or authorizing electronic payment or debit from a specified checking account identified in the electronic tax return.

While known systems and methods have worked to effectively refund taxes that have been overpaid and to coordinate payment of taxes due, they provide the user with limited options regarding how the tax refund may be utilized or invested or from which accounts the tax payment may be paid. These limitations may result in negative financial consequences that are not readily apparent to the user.

For example, once users have a tax refund check or receive the deposit in a designated single account, they often spend this "new found money" right away to purchase items such as televisions, furniture, automobiles, etc. In addition to not saving this money, the user may be burdened with more debt since the tax refund is already spent and additional money may be required to cover the additional costs beyond the amount of the tax refund. Further, the cost of such expenditures goes beyond the out of pocket money that was spent for these items.

The user may be burdened with higher interest credit card and loan debt, and not reducing the balances on these accounts results in payment of more interest and eventually more money spent out of pocket by the user. With compounding credit card or loan balances, this can be problematic.

Further, options presented by the tax preparation program to the user for a refund deposit may provide for entry of only one checking account. The refund may be deposited into that checking account but, for various reasons, may not be later moved by the user to a different checking, savings, money market or Certificate of Deposit (CD) account that earns a higher rate of interest, thereby resulting in "lost money" that could have otherwise been earned by the user.

As another example, the user may pay taxes due with a credit card rather than by payment from a checking account. The credit card may have a very high interest rate (e.g., 20%) compared to the checking account that typically has a much lower interest rate (e.g., 1%). Given tendencies of consumers to carry high credit card balances, the cost of the tax payment may be substantially higher than the actual amount of the tax payment. Similar issues arise when tax payments are made from higher interest checking, savings, money market and CD accounts rather than lower interest accounts.

Thus, users of tax preparation programs have received tax refunds in the past in the form of a single payment or into a single account, but they may not fully appreciate how that money could be utilized, how the values of those other uses can exceed the amount of the tax refund, and how spending the refund may result in additional financial burdens. Instead, they often "receive and spend" without significant thought as to other potential uses or values of the tax refund. Further, users may not select, or may not be able to select, the best source of funds to pay a tax payment. These limitations may be due in part to user decisions and/or restrictions of the tax preparation program itself, which may only provide very limited refund and payment options. Consequently, in both of the refund and payment cases, users may spend more money and/or earn or save less money than they could have and these results are often overlooked or not appreciated by users.

SUMMARY

One embodiment is directed to a method of allocating a tax refund and comprises determining or receiving tax refund amount at an intermediate computer that is operably connected through respective networks to a computer of a tax authority and a computer of the user of a tax preparation program. The tax preparation program is executed to prepare an electronic tax return and determine the amount of the tax refund. The method further comprises receiving the tax refund at the intermediate computer and transferring respective portions of the tax refund from the intermediate computer to different accounts. Thus, method embodiments transform an amount of a tax refund as determined by a tax preparation program into a plurality of refund portions that are allocated to different accounts. Further, refunds are routed to the user through an intermediate computer rather than directly from the tax authority to the user. In this manner, embodiments operate in contrast to known systems and methods that involve mailing a refund check from the tax authority to the user or electronically depositing the refund into a single account specified in the electronic tax return.

Another embodiment is directed to a method of allocating a tax refund and comprises determining or receiving a tax refund amount at an intermediate computer that is operably connected through respective networks to a computer of a tax authority and a computer of the user of a tax preparation program. The tax preparation program is executed to prepare an electronic tax return and determine the amount of the tax refund. The method further comprises identifying accounts that are available to receive at least a portion of the tax refund, determining how to allocate the tax refund among selected accounts of the available accounts to increase a value of the tax refund relative to the tax refund amount, receiving the tax refund at the intermediate computer, and transferring respective portions of the tax refund from the intermediate computer to respective selected accounts based at least in part upon the determined allocation. Thus, method embodiments transform an amount of a tax refund into a plurality of refund portions that are allocated to different accounts and route refunds to users through the intermediate computer rather than directly from the tax authority to the users.

Another embodiment is directed to a method of processing a tax refund and comprises transferring a tax refund of a user of a tax preparation program from a computer of a tax authority to an intermediate computer through a first network, and transferring the tax refund from the intermediate computer to different accounts of the user according to an allocation of the tax refund determined utilizing the intermediate computer.

Method embodiments may performed by executable code, software or instructions, which may be stored on an article of manufacture comprising a computer program carrier that is readable by a computer such that instructions are executable by the computer to perform method steps of programming a computer for allocating a tax refund to accounts as summarized above.

A further embodiment is directed to a system for allocating a tax refund and comprises a user computer, an intermediate computer and a tax authority computer. The intermediate compute is operably coupled to and between the user computer and the tax authority computer through respective networks. The intermediate computer is also operably coupled through respective networks to one or more financial institutions that host accounts of the user of a tax preparation program, which may be a desktop or remote version. The tax preparation program is executed to prepare an electronic tax return and determine an amount of a tax refund. The electronic tax return and/or tax refund amount is sent to the intermediate computer, which is programmed or configured divide or allocate the tax refund amount into refund portions, receive the refund from the tax authority, and transfer respective portions of the tax refund to multiple or different accounts, which may be at the same or different financial institution. In this manner, embodiments are structured differently than known systems in which the refund (in the form of a check or electronic deposit) is sent directly from the tax authority to the user. Instead, the refund is sent indirectly to the user through the intermediate computer, which allocates the tax refund among different accounts.

Another embodiment is directed to a system for allocating a tax refund and comprises a user computer, an intermediate computer and a tax authority computer. The intermediate computer is operably coupled to the user computer and the tax authority computer through respective networks. The intermediate computer is also operably coupled through respective networks to one or more financial institutions that host accounts of the user of a tax preparation program (desktop or remote version). The tax preparation program is executed to prepare an electronic tax return and determine an amount of a tax refund. The electronic tax return and/or tax refund amount is sent to the intermediate computer and is programmed or operable to identify accounts that are available to receive at least a portion of the tax refund, receive the refund from the tax authority, allocate or transform the tax refund into refund portions, which are transferred from the intermediate computer to respective selected accounts of the identified accounts based at least in part upon the determined allocation to increase the value of the tax refund relative to the amount of the tax refund.

Yet another embodiment is directed to a method of processing or allocating a tax payment among different sources of funds and comprises determining or receiving an amount of the tax payment at an intermediate computer operably connected through respective networks to a computer of a tax authority and a computer of a user of a tax preparation program. The tax preparation program is executed to prepare an electronic tax return and determine the amount of the tax payment due. The method further comprises receiving or requesting respective portions of the tax payment at the intermediate computer from different accounts of the user (e.g., by withdrawing the portions from the different accounts), and transferring the tax payment from the intermediate computer to the computer of the tax authority.

Another embodiment is directed to a method of processing or allocating a tax payment and comprises determining or receiving an amount of the tax payment at an intermediate computer operably connected through respective networks to a computer of a tax authority and a computer of a user of a tax preparation program. The tax preparation program is executed to prepare an electronic tax return and determine the amount of the tax payment. The method further comprises identifying accounts of the user that are available for payment of at least a portion of the tax payment, determining how to allocate the tax payment among selected accounts of the identified accounts to reduce a cost of the tax payment over time relative to paying the tax payment from a single account, receiving or requesting respective portions of the tax payment at the intermediate computer from respective selected accounts (e.g., by withdrawing the portions from the accounts), and transferring the tax payment from the intermediate computer to the computer of the tax authority.

A further embodiment is directed to a method of processing a tax payment and comprises receiving, from respective accounts of a user of a tax preparation program, through respective networks, and at an intermediate computer, respective portions of the tax payment according to tax payment allocation determined utilizing the intermediate computer, and transferring the tax payment from the intermediate computer to a computer of a tax authority.

Method embodiments may performed by executable code, software or instructions, which may be stored on an article of manufacture comprising a computer program carrier that is readable by a computer such that instructions are executable by the computer to perform method steps of programming a computer for allocating a tax payment for payment from accounts as summarized above.

A further embodiment is directed to a system for allocating a tax payment among different accounts or sources of funds and comprises a user computer, an intermediate computer and a tax authority computer. The intermediate compute is operably coupled to and between the user computer and the tax authority computer through respective networks. The intermediate computer is also operably coupled through respective networks to one or more financial institutions that host accounts of the user of a tax preparation program (desktop or remote version). The tax preparation program is executed to prepare an electronic tax return and determine an amount of tax due. The electronic tax return and/or the amount of tax due is sent to the intermediate computer, which is programmed or configured to receive (e.g., by withdraw) respective portions of the tax payment at the intermediate computer from different accounts of the user, and transfer the tax payment from the intermediate computer to the computer of the tax authority to pay the taxes due.

An additional embodiment is directed to a system for allocating a tax payment among different accounts or sources of funds and comprises a user computer, an intermediate computer and a tax authority computer. The intermediate compute is operably coupled to the user computer and the tax authority computer through respective networks. The intermediate computer is also operably coupled through respective networks to one or more financial institutions that host accounts of the user of a tax preparation program (desktop or remote version). The tax preparation program is executed to prepare an electronic tax return and determine an amount of a tax due. The electronic tax return and/or the amount of tax due is sent to the intermediate computer, which is programmed or configured to identify accounts of the user that are available for payment of at least a portion of the tax payment, determine how to allocate the tax payment among selected accounts of the identified accounts to reduce a cost of the tax payment over time relative to paying the tax payment from a single account, receive (e.g., by withdraw) respective portions of the tax payment at the intermediate computer from respective selected accounts, and transfer the tax payment from the intermediate computer to the computer of the tax authority.

Embodiments may be performed by the tax preparation program, a module thereof, or a separate program associated with the tax preparation program. Examples of tax preparation application in which or by which embodiments may be executed include TurboTax®, ProSeries® and Lacerte® tax preparation programs, which are known consumer and professional tax preparation programs available from Intuit Inc., Mountain View, Calif., H&R Block TaxCut software, available from H&R Block, Inc., Kansas City, Mo., and TaxACT® software available from $2^{nd}$ Story Software, Inc. TurboTax®, ProSeries® and Lacerte® are registered trademarks of Intuit Inc., and TaxACT® is a registered trademark of $2^{nd}$ Story or a separate program that can be utilized with tax preparation programs or that can be configured to receive data generated by a tax preparation program. Certain steps may be based on input provided by the user. For example, in certain embodiments, the tax refund or tax payment amount may be received as an input from the user who may input the amount (e.g., as an estimate or test) or take the amount generated by the tax preparation program and provide the amount as an input to another element or module of the tax preparation program or to another program operable for tax refund or payment allocation. In other embodiments, the tax refund or payment amount is determined by the tax preparation program and utilized thereby or by an associated module or program to determine how to allocate the tax refund to different accounts or to determine sources from which tax payment portions can be withdrawn.

In one or more embodiments, the value of the tax refund relative to the amount of the tax refund is increased by transferring respective portions of the tax refund to different accounts, which may be accounts of different financial institutions and/or different types of accounts (e.g., asset accounts such as savings, checking, money market, bond, treasuries and stock, and liability accounts such as credit card or loans accounts including mortgage, automobile and school loans. Thus, in contrast to known methods and systems that involve a user specifying a single account (by account number and routing number) in the electronic tax return for receiving the tax refund, embodiments provide for intelligent allocation of a tax refund to multiple accounts through the use of an intermediate server or broker to analyze allocation options, and determine or provide options for increasing the value of the tax refund, and facilitating transfer of tax refund portions to respective accounts after the tax refund (and authorization if necessary) is received from the tax authority at the intermediate computer.

In one or more embodiments, the cost of a tax payment over time is reduced by receiving or withdrawing respective portions of the tax payment from different accounts, which may be accounts of different financial institutions and/or different types of accounts such as the asset and liability accounts mentioned above. Thus, in contrast to known methods and systems that involve a user specifying a single account (by account number and routing number) in the electronic tax return for payment of tax, embodiments provide for intelligent allocation of a tax payment from multiple accounts through the use of an intermediate server or broker to analyze allocation options, decrease the cost over time of the tax payment, and facilitate payment from respective accounts to the tax authority.

According to one embodiment, the computer that is utilized to receive tax refund funds from the tax authority and to distribute portions of the tax refund to respective accounts, or receive tax payment funds from user accounts and send the payment to the tax authority, is the same intermediate computer that formats the electronic tax return that is generated by the tax preparation program and electronically files the formatted electronic tax return with the tax authority. A separate intermediate computer may also be utilized to perform these tasks.

According to one embodiment, embodiments are performed by the tax preparation program (or a module thereof or related program), which is executed, in the case of a refund, to determine the amount of the tax refund, identify available accounts, select accounts, determine how to allocate the tax refund among selected accounts, and transfer respective portions of the tax refund to respective selected accounts, or in the case of a payment, determine the amount of the tax payment, identify available accounts or sources of funds, select accounts, determine how to allocate the tax payment among selected accounts, and receive or withdraw respective portions of the tax payment and transfer the payment to the tax authority. Certain steps may also be performed by the user of the tax preparation program, e.g., selecting accounts, selecting portions of the tax refund to be transferred to a particular account or confirming or adjusting an allocation determined by the tax preparation program or related program, selecting portions of the tax payment to be withdrawn from a particular account or confirming or adjusting an allocation determined by the tax preparation program or related program.

According to one embodiment, in the case of a refund, at least a portion of the tax refund is transferred to each of the identified accounts. According to another embodiment, a subset of available accounts is selected by the allocation program or user such that only certain selected accounts receive a portion of the tax refund. Selection of accounts for purposes of refund allocation may be based at least in part upon whether account satisfies pre-determined criteria. Pre-determined criteria may include, for example, a balance of the account and/or an interest rate of the account. For example, embodiments can be configured to exclude low interest rate accounts such that the refund is allocated to higher interest rate accounts to increase or maximize the value of the refund. In the case of a payment, at least a portion of the tax payment may be made from each of the identified accounts. According to another embodiment, a subset of available accounts is selected such that funds from only certain selected accounts are used to pay the tax due. Selection of accounts for purposes of payment allocation may also be based at least in part upon whether account satisfies pre-determined criteria such as a balance of the account and/or an interest rate of the account. For example, embodiments can be configured to exclude low balance accounts to prevent the user from overdrawing the account.

Selection of an account may also depend on whether a deposit of at least a portion of a tax refund, or payment of at least a portion of the tax due, would adjust an interest rate of the account. For example, in the case of a refund, an account may be selected to receive at least a portion of the tax refund if transferring at least a portion of the tax refund into the account would increase the balance of the account to a level such that the interest rate would be increased to the next interest rate level or step. In the case of a payment, an account may not be selected to pay at least a portion of the tax payment if transferring funds from that account would cause the balance of the account to drop a level such that the interest rate would be decreased to the next interest rate level or step.

Further, the pre-determined criteria may be a penalty or reward associated with the account. Thus, in the case of a refund, an account may be selected to receive at least a portion of the tax refund if transferring at least a portion of the tax refund to the account would prevent or reduce the penalty or qualify the user for the reward. These examples of smart or intelligent tax refund allocations increase, and can maximize, the value of the tax refund compared to the value of the refund that the user of the tax preparation program may receive in the form of a check, for example. In the case of a payment, an account may not be selected if transferring at least a portion of the tax payment from the account would result in a penalty or cause a loss of a reward. These examples of smart or intelligent tax refund and payment allocations can increase (e.g., maximize), the value of the tax refund over time compared to the value of the refund, and can decrease (e.g., minimize), the cost of the tax payment over time.

Information related to accounts, interest rates and other factors that may be considered by embodiments may be acquired or derived from information that already exists within the electronic tax return (e.g., the user has a mortgage, paid a certain amount in deductible interest) and/or with reference to an external source or computer (e.g., a financial institution computer) that is operably coupled to or in communication with the intermediate server. For example, for a mortgage, the fact that the user had a mortgage and a certain amount of deductible interest from a certain financial institution may cause the computer of that financial institution to be accessed in order to acquire additional information about the mortgage (e.g., balance, loan terms, etc.). Financial information may also be acquired from a personal finance program.

In one or more embodiments, allocation options and/or values are displayed to the user who may then select an allocation option. For example, in the case of a refund, if the user is entitled to a refund in the amount of $1,000, there may be a first option or object indicating that the $1,000 can be allocated to different accounts such that the value of that $1,000 is $1,200, and a second option or object indicating that the $1,000 can be allocated to different accounts such that the value is $1,400. The user may confirm or select a displayed allocation or value to see more details regarding the proposed allocations (e.g., accounts, balances, interest rates, etc.). In another embodiment, the options include the more detailed information. The user can select or confirm a displayed option or select accounts, allocation percentages or amounts. For example, a proposed allocation may be presented to the user who may then confirm, adjust or reject the proposed allocation, and the user can adjust the proposed allocation or submit a new allocation.

In the case of a tax payment, if the user is required to pay $1,000, there may be a first option or object indicating that paying $1,000 from a certain account will cost the user $1,100 due to lost interest in a year, and a second option or object indicating the that the $1,000 payment will cost $1,200 if the payment is made from a higher interest rate account. The user may then select the desired value or object to see more details regarding the allocations (e.g., accounts, balances, interest rates, etc.). In another embodiment, the options include the more detailed information. The user can select or confirm a displayed option or select accounts, allocation percentages or amounts. For example, a proposed allocation may be presented to the user who may then confirm, adjust or reject the proposed allocation, and the user can adjust the proposed allocation or submit a new allocation.

Embodiments may be configured to allocate an entire tax refund or portions thereof to accounts with the greatest earning or savings potential, e.g., to the account with the highest interest rate or to the loan or credit card account with the highest interest rate, in order to maximize the value of the refund over time. Embodiments may also be configured to allocate portions of the tax refund equally to various accounts or in different proportions. Embodiments may also be configured to allocate a tax refund to various accounts based on user preferences or other criteria. Thus, there may be cases in which the tax refund allocation seeks to maximize the value of the tax refund or to increase the value without maximizing the value in view of, for example, higher rate credit card debt, but embodiments are not so limited since embodiments provide for allocation to two, three, four, five and other numbers of accounts. It should be understood that embodiments of intelligent allocation can be adapted to increasing the value of the tax refund by various degrees and to various numbers and types of accounts.

Embodiments may also be configured to allocate an entire tax payment or portions thereof to be paid from accounts with the lowest earning or savings potential, e.g., to the account with the lowest savings rate or to the loan or credit card account with the lowest interest rate, in order to minimize the cost of the payment over time. Embodiments may also be configured to allocate portions of the tax payment equally to various accounts or in different proportions. Embodiments may also be configured to allocate a tax payment to various accounts based on user preferences or other criteria. Thus, there may be cases in which the tax payment allocation seeks to minimize the cost of the payment over time or to reduce the cost relative to a pre-determined or standard cost (e.g., based on withdrawing the payment from a certain account) in view of, for example, higher loan and credit card rates that could be used to pay the tax due. However, embodiments are not so limited since embodiments provide for payment of tax from two, three, four, five and other numbers of accounts. It should be understood that embodiments of intelligent allocation can be adapted to decrease the cost of the tax payment by various degrees and to receive or withdraw payment from various numbers and types of accounts.

BRIEF DESCRIPTION OF THE DRAWINGS

The foregoing and other aspects of embodiments are described in further detail with reference to the accompanying drawings, wherein:

FIGS. 9A-C illustrate examples of how the allocation program may analyze accounts for intelligent tax refund allocation, wherein FIG. 9A shows how the allocation program may be programmed to prioritize allocating larger portions of a tax refund to higher interest debt compare to lower interest savings, FIG. 9B shows how the values of different allocation options can be displayed to the user, and FIG. 9C shows one embodiment in which the allocation program considers how interest rates in interest earning accounts vary depending on account balances;

DETAILED DESCRIPTION OF ILLUSTRATED EMBODIMENTS

Embodiments relate to smart or intelligent finance applications or programs such as smart or intelligent tax preparation programs and use of an intermediate computer that is utilized to analyze how tax refunds and payments should be allocated and to route refunds and tax payments between the user and the tax authority. Embodiments are structured and function in manner that differs from known systems and methods in which refunds and payments are provided directly between the tax authority and the user (or user's bank) since in embodiments, a tax preparation program is configured to determine how a refund can be allocated to different user accounts to increase the value of the tax refund over time, and how tax payments should be allocated such that portions of the tax due are paid from various accounts to reduce the cost of the tax payment over time. In this manner, embodiments transform a static tax refund as a one time windfall and a static tax payment as a one time expense into a dynamic analysis of refunds and tax payments and how refunds and tax payments can be deposited and paid in a financially beneficial or less detrimental manner.

Figure 1:
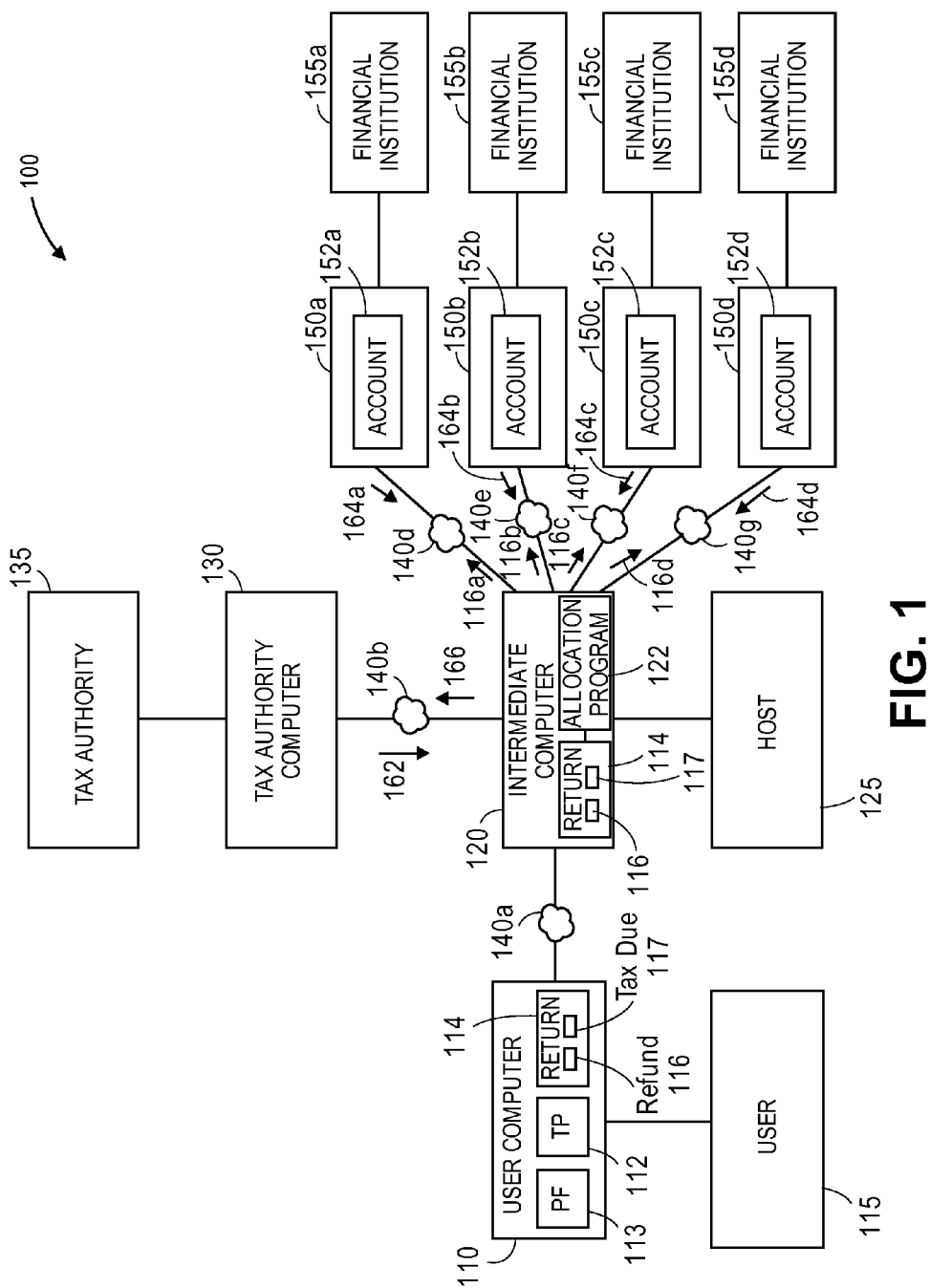
FIG. 1 illustrates one embodiment of a system configured or operable for intelligent tax refund allocation involving different accounts of different financial institutions.

Referring to FIG. 1, a system 100 constructed according to one embodiment is configured or operable to facilitate processing of tax refunds and tax payments utilizing an intermediate computer (other than a computer of a financial institution hosting a checking or savings account of a user). The system 100 includes a first computer 110, a second or intermediate computer 120 and a third or tax authority computer 130. The computers 110, 120, 130 are arranged to communicate with each other and configured such that the intermediate computer 120 serves to facilitate processing of tax refunds and tax payments and determines how a tax refund can be allocated to various accounts and how to allocate payment of tax due from various accounts in a financially beneficial manner.

In the illustrated embodiment, the first computer 110 is a computer of a user 115 who may execute or utilize tax preparation program 112 ("TP" in FIG. 1) and who may also utilize a personal finance program 113 ("PF" in FIG. 1) to manage personal or corporate finances. The user computer 110 may be, for example, a desktop, laptop, home, office or other computer. The tax preparation program 112 may be utilized to prepare and electronically file an electronic tax return 114. Data of the electronic tax return 114 may be manually entered by the user 115 or imported from a file or data of the personal finance program 113. The electronic tax return 114 indicates an amount of a refund 116 or an amount of tax due 117.

Examples of desktop and online tax preparation programs 112 that may be utilized or adapted for use with embodiments, or that may include or execute embodiments, include, for example, TurboTax®, ProSeries® and Lacerte® tax preparation programs, which are known consumer and professional tax preparation programs available from Intuit Inc., Mountain View, Calif., H&R Block TaxCut software, available from H&R Block, Inc., Kansas City, Mo., and TaxACT® software available from $2^{nd}$ Story Software, Inc. TurboTax®, ProSeries® and Lacerte® are registered trademarks of Intuit Inc., and TaxACT® is a registered trademark of $2^{nd}$ Story Software, Inc. For ease of explanation, reference is made generally to a tax preparation program 112, but it should be understood that embodiments may involve various desktop and on-line tax preparation programs 112.

The user 115 may be an individual, a corporate entity, a tax professional or other user 140 (generally, "user"). Thus, the term "user" 115 is defined to include all of these types of users and is further defined, for ease of explanation, as the person or entity for whom or for which an electronic tax return 114 is prepared. Thus, a "user" 115 may be an individual who utilizes the tax preparation program 112 to prepare his or her own electronic tax return 114. Such users 115 may hire an accountant or tax professional to prepare and file the electronic tax return 114 on his or her behalf. Thus, the term "user" 115 is defined to include the person who actually utilizes the tax preparation program 112 to prepare the electronic tax return 114, a person who hires someone such as an accountant or tax professional to prepare the electronic tax return 114, and the accountant or tax professional who utilizes the tax preparation program 112 to prepare an electronic tax return 114 for a client. For ease of explanation, reference is made generally to a "user" 115 of the tax preparation program 112.

In the illustrated embodiment, the system 100 includes a second, broker, facilitating or intermediate computer 120 (generally, "intermediate computer" 120), which may be a computer of a host 125 such as Intuit Inc. or other companies offering tax or financial services and programs such as tax preparation programs 112 and personal finance programs 113. An allocation program 122 executes on the intermediate computer 120 or an associated computer (not shown). The allocation program 122 may be part of the tax preparation program 112 (e.g., a module thereof) or a separate program (as shown in FIG. 1) that is operable with or executed by the tax preparation program 112. Thus, while the allocation program 122 is shown as a separate program, it should be understood that the allocation program 122 may also be a part of the tax preparation program 112. For ease of explanation, reference is made to the allocation program 122 hosted by the intermediate computer 120, and steps being performed by the tax preparation program 122 or the intermediate computer 120 hosting the allocation program 122.

The intermediate computer 120 is in communication with or operably coupled to the user computer 110 through a network 140a and in communication with or operably coupled to a computer 130 of a tax authority 135 through a network 140b. Examples of tax authorities 135 include the Internal Revenue Service (IRS), a state tax authority and other tax collecting entities (generally, "tax authority" 135).

Each of the networks 140a-b (and other networks discussed herein, generally, "network 140") may be different, or two or more networks 140 may be the same depending on the system configuration and communication protocols employed. One or more or all of the networks 140 may be, for example, a cellular network, a wireless network, a Local Area Network (LAN) and/or a Wide Area Network (WAN). Thus, reference to a network 140 generally is not intended to refer to a specific network or communications protocol, and it should be understood that embodiments can be implemented using various networks 140 and combinations thereof.

In the illustrated system 100, the intermediate server 120 may serve as, or be in communication with, an electronic filing system or server that functions as a "clearing house" for formatting and transmitting completed electronic tax returns 114 to the computer 130 of the tax authority 135. The intermediate server 120 or clearing house may also process acknowledgements and other data received from the tax authority computer 130 and to route related information back to the user computer 110. One example of intermediate or electronic filing server 120 is a server of Intuit Inc., e.g., a server of the Intuit Electronic Filing Center. Other examples of intermediate or electronic filing servers 120 include electronic filing servers utilized by TaxCut and TaxACT® tax return preparation programs.

In the embodiment illustrated in FIG. 1, the tax preparation program 112 and the personal finance program 113 are local or desktop versions that execute on the user computer 110. The completed electronic tax return 114 is transmitted from the user computer 110 via the network 140a to the intermediate server 120.

Figure 2:
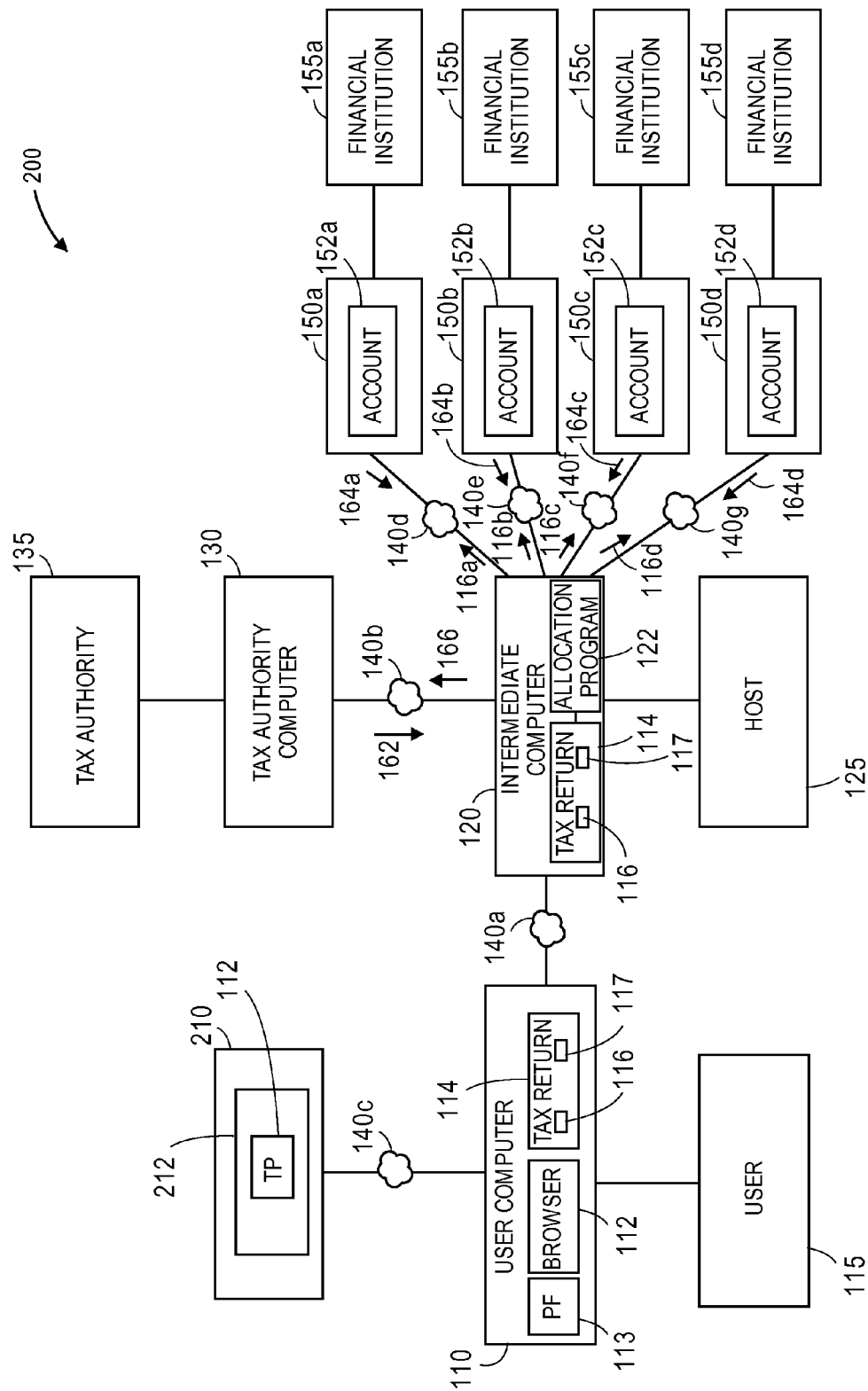
FIG. 2 illustrates one embodiment of a system configured or operable for intelligent tax refund allocation in which an electronic tax return is prepared utilizing an on-line tax preparation program.

Referring to FIG. 2, systems 200 may also involve on-line versions of such programs that reside on a server 210 that is accessible by the user computer 110 via network 140c. The server 210 may host a website 212 that includes the tax preparation program 112, and the user 115 may access the website 212 and the tax preparation program 112 through the network 140c using a web browser 214 that executes on the user computer 110. The electronic tax return 114 is transferred from the user computer 110 to the intermediate computer 120. The tax preparation program 112 may also reside on the intermediate computer 120. For ease of explanation, reference is made to the system configuration shown in FIG. 1, but it should be understood that other system configurations may be utilized and that the system 100 shown in FIG. 1 illustrates one example of how embodiments ma be implemented.

Referring again to FIG. 1, the intermediate computer 120 receives or accesses the electronic tax return 114, and, the allocation program 122 is provided with, retrieves or reads the amount of the refund 116 or the tax due 117 from the electronic tax return 114. The intermediate computer 120 is also in communication with or operably coupled to computers 150 of various financial institutions (FI) 155 that host accounts 152 of the user 115.

In the embodiment illustrated in FIG. 1, the intermediate computer 120 is in communication with four computers 150a-d (generally 150), but embodiments may involve other numbers of computers 150. Further, in the embodiment illustrated in FIG. 1, each of the computers 150a-d hosts respective accounts 152a-d, but as shown in FIG. 3, each financial institution computer 150 may host one or multiple accounts 152 of the user 115 in other system 300 configurations.

Figure 3:
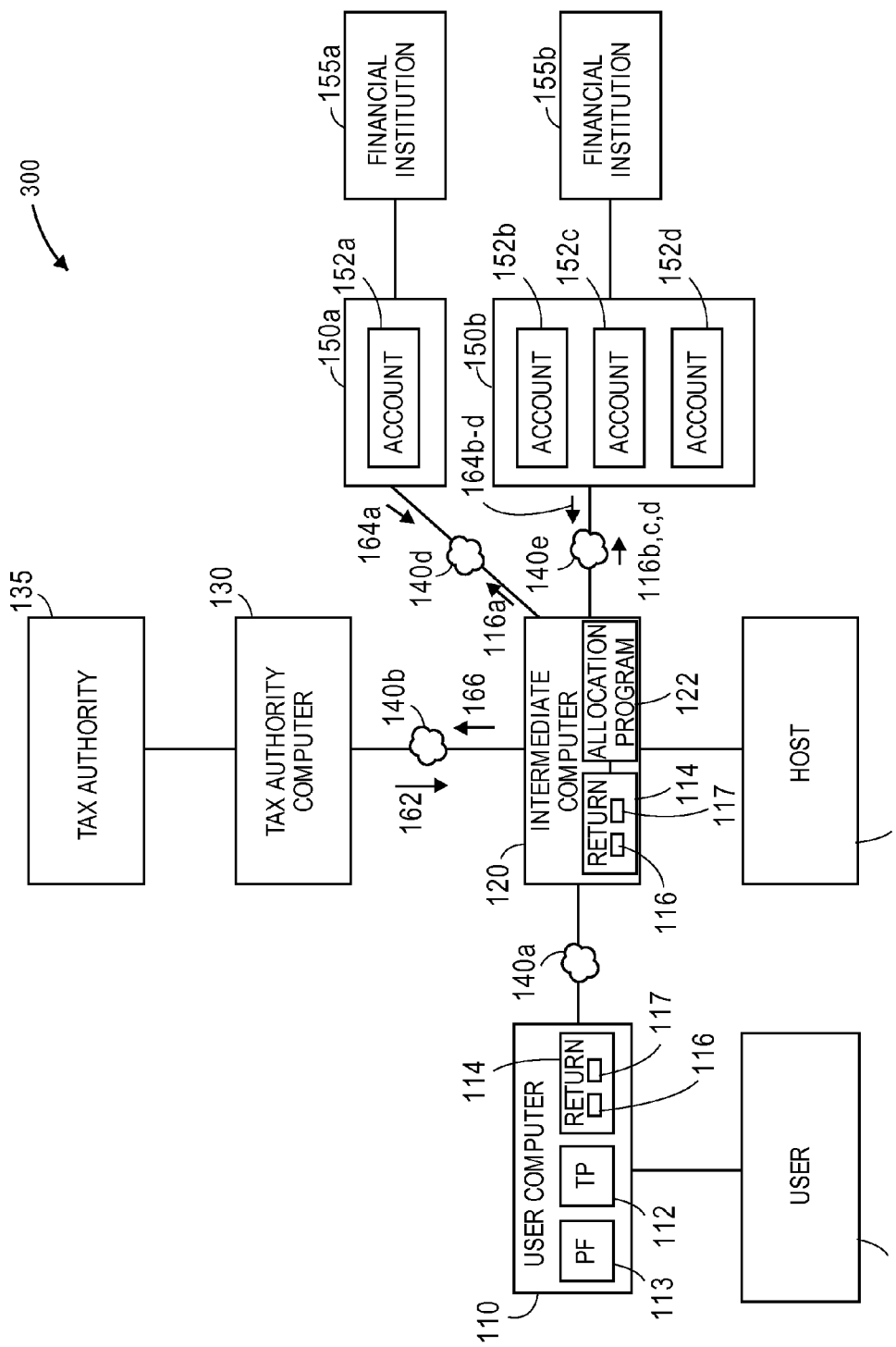
FIG. 3 illustrates one embodiment of a system configured or operable for intelligent tax refund allocation to different accounts and in which certain accounts are accounts of the same financial institution.
Figure 4:
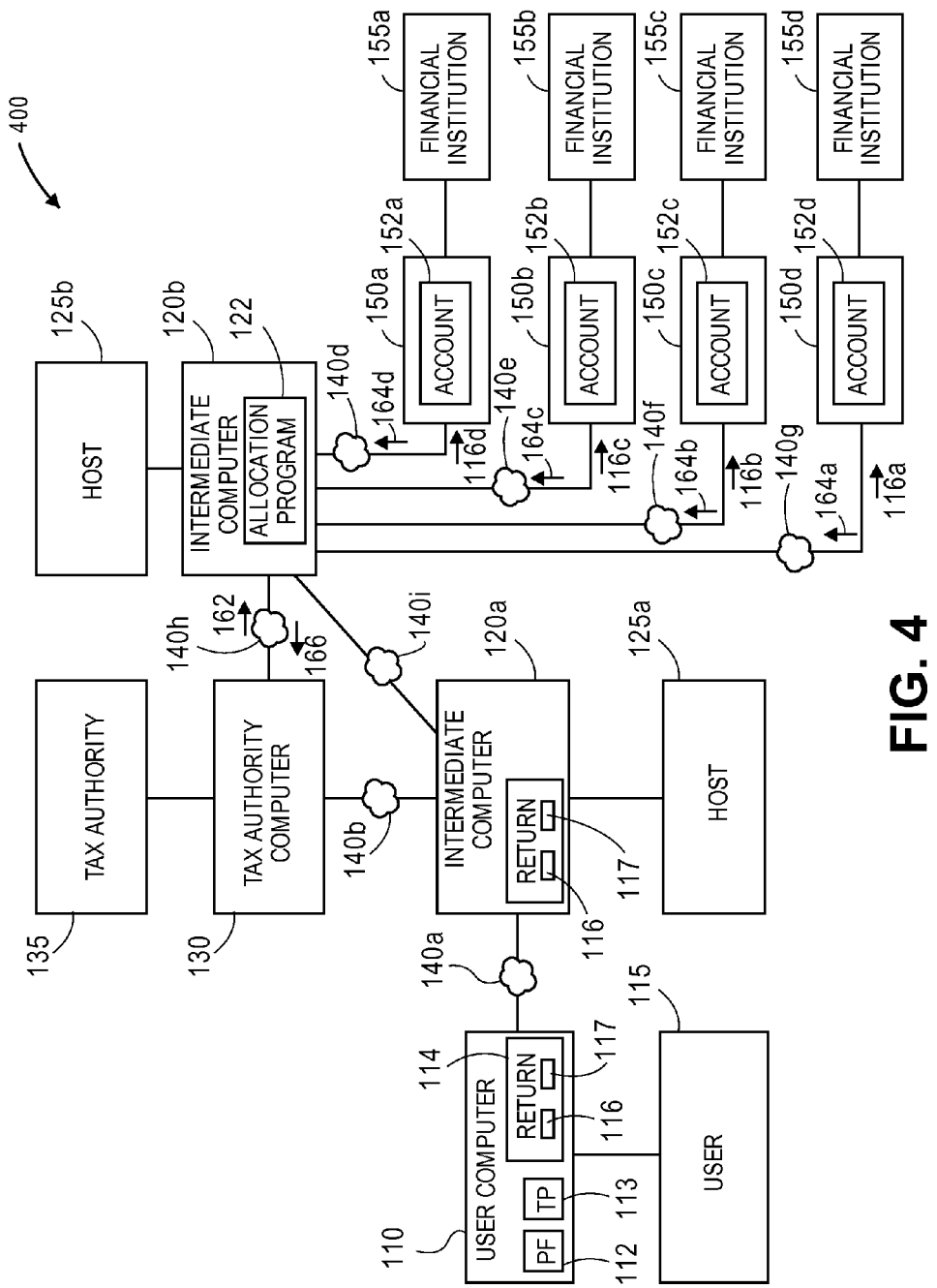
FIG. 4 illustrates one embodiment of a system configured or operable for intelligent tax refund allocation among different accounts in which a first intermediate server is utilized for electronic filing of a tax return and a second intermediate server is utilized for tax refund payment allocation.

In the embodiments illustrated in FIGS. 1-3, the intermediate computer 120, which may format and electronically file an electronic tax return 114 and serve as a clearing house, is in communication with the financial institution computers 150. However, in another embodiment, as shown in FIG. 4, in another system 400 configuration, a first intermediate computer 120a of a host 125a may format and electronically file an electronic tax return 114 and serve as a clearing house as described above, and a second intermediate computer 120b of a host 125b can host the allocation program 122 and interface with computers 150 of financial institutions 155 that host accounts 152 of the user 115 to facilitate transfer of portions of the tax refund 116 to respective accounts 152.

Figure 5:
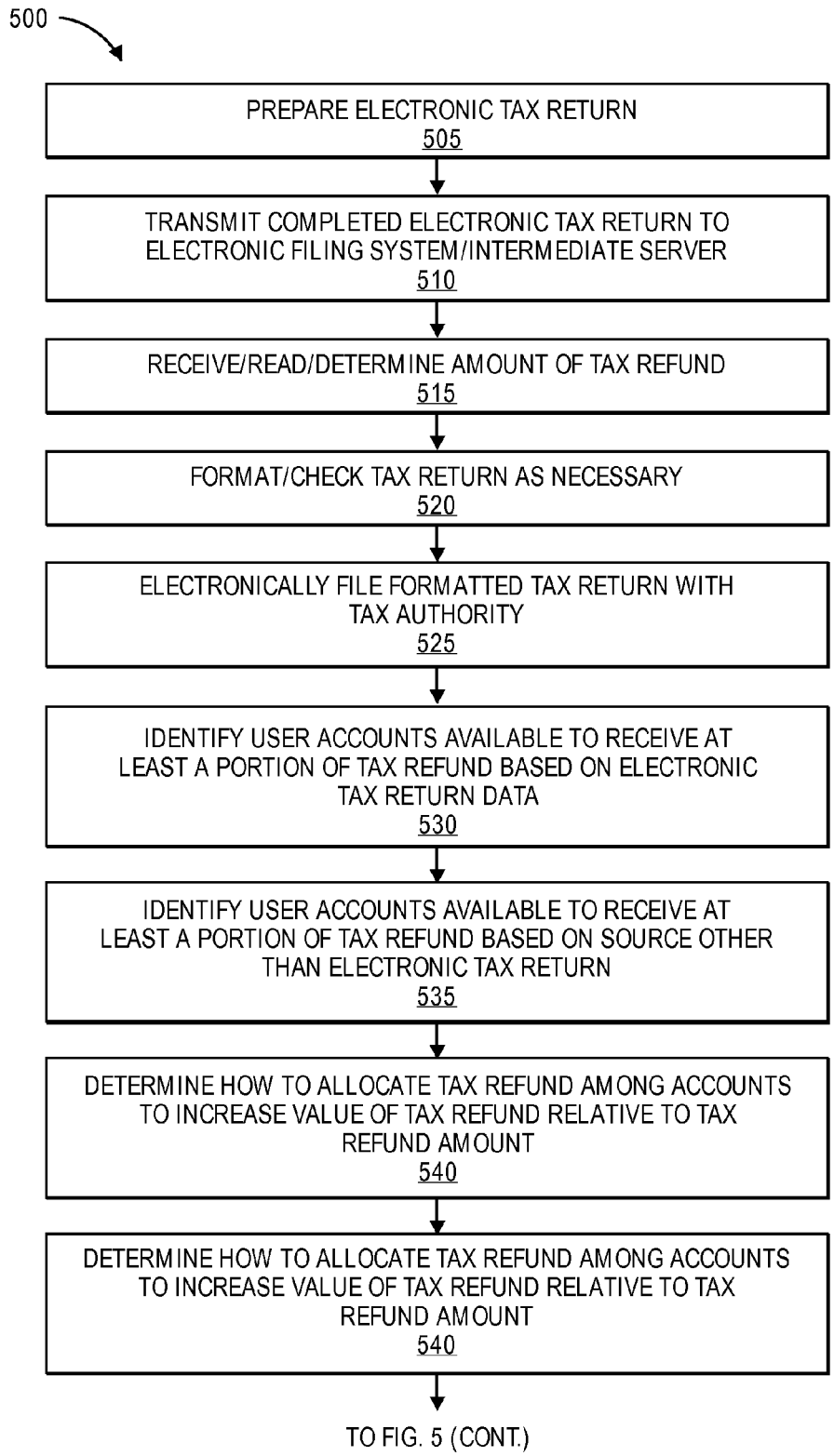
FIG. 5 is a flow diagram of one embodiment of a method for allocating a tax refund among different accounts to increase the value of the tax refund.
Figure 5:
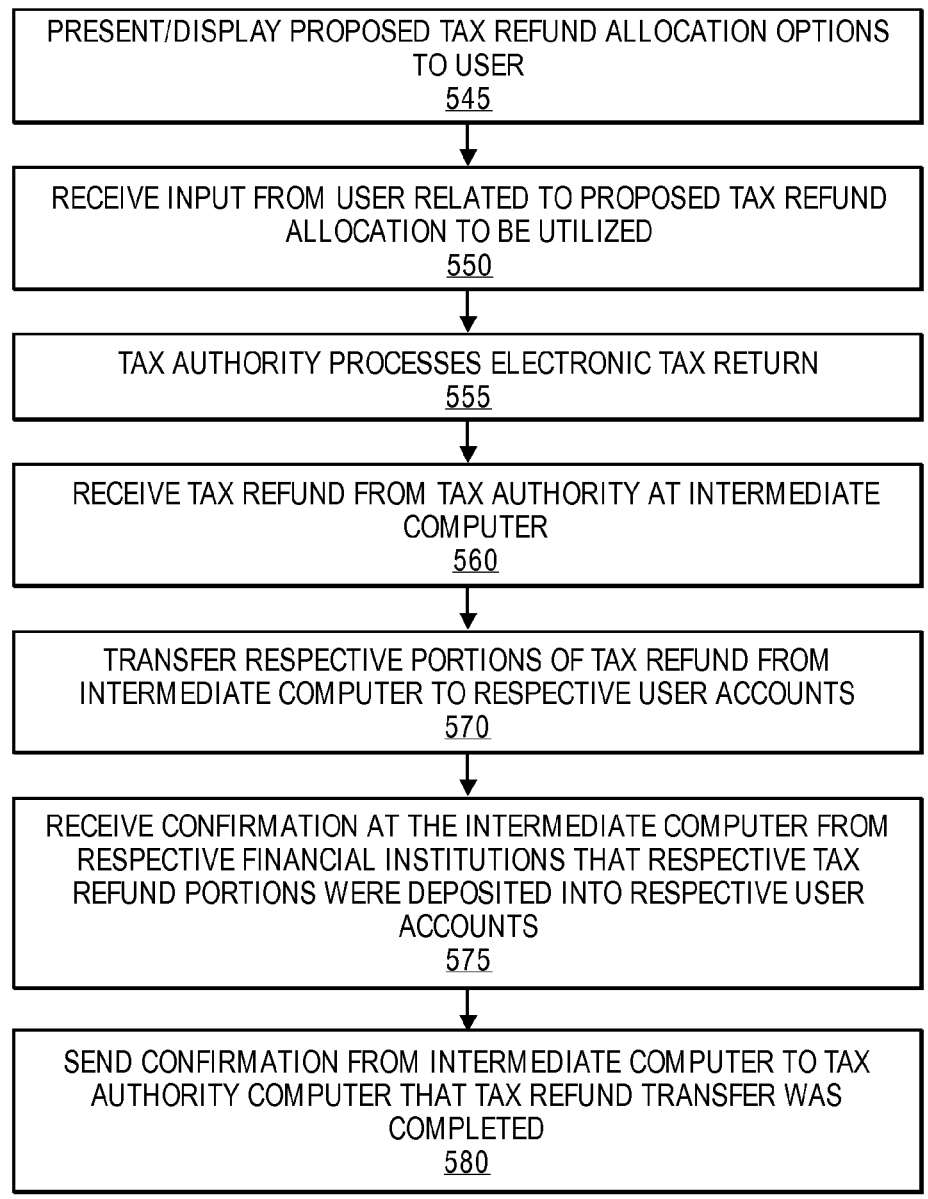

Referring to FIG. 5, a method 500 that may be implemented using systems shown in FIGS. 1-4, for allocating a tax refund 116 to different user accounts 152 to increase a value of the tax refund 116 comprises, at stage 505, preparing an electronic tax return 112 utilizing the tax preparation program 114, and at stage 510, transmitting the completed tax return 114 to the intermediate computer 120. At stage 515, the amount of the tax refund 116 is received by the allocation program 122 or read by the allocation program 122 from the electronic tax return 114. At stage 520, the electronic filing system or intermediate server 120 formats or checks the electronic tax return 114 as necessary, and at stage 525, electronically files the formatted tax return 114 with the tax authority computer 130.

Figure 6:
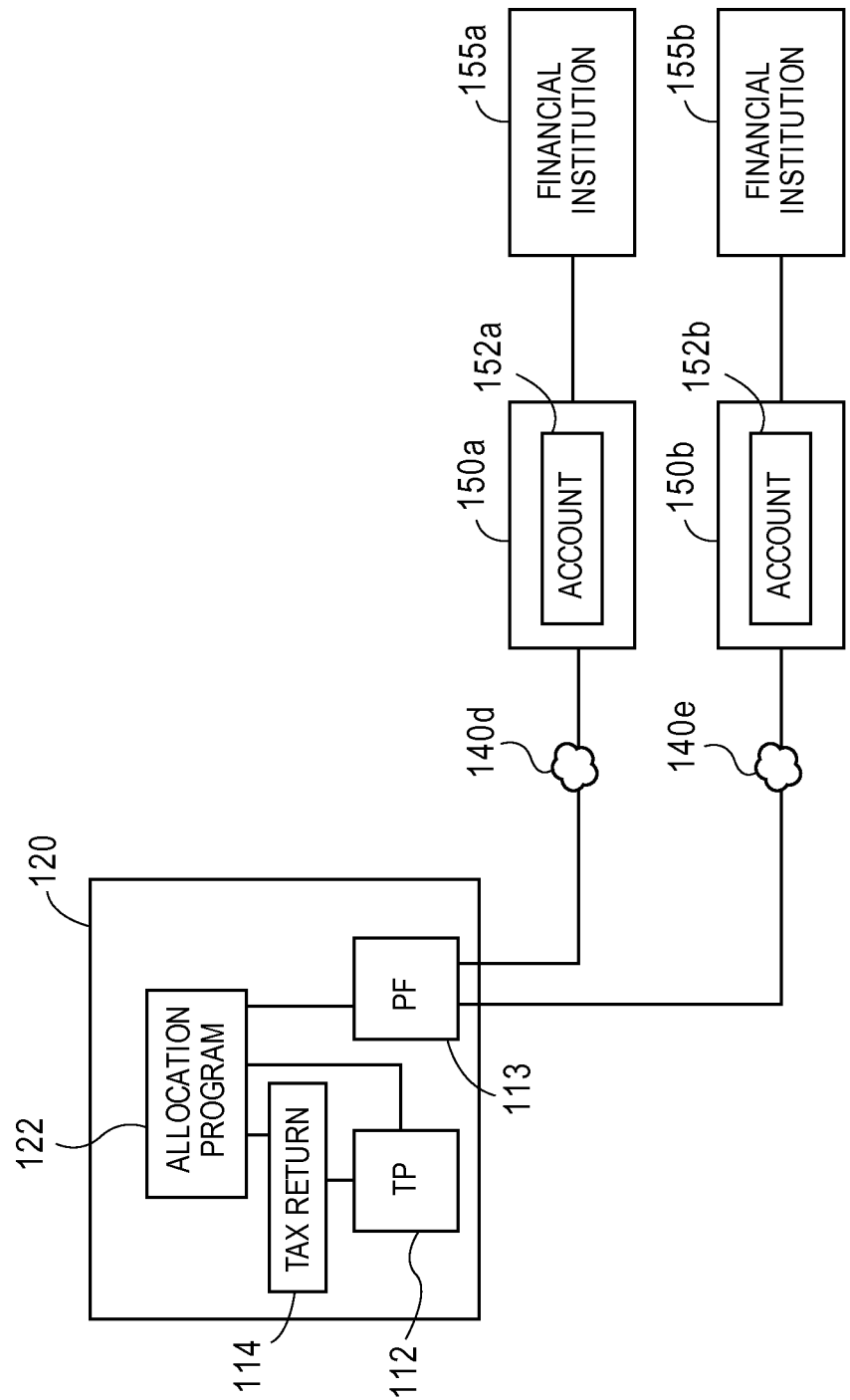
FIG. 6 is a system diagram illustrating how the allocation program may utilize different sources of account data to determine how to allocate a tax refund according to embodiments.

At stage 530, and with further reference to FIG. 6, the allocation program 122 identifies user accounts 152 that are available to receive at least a portion of tax refund 116 based on data of the electronic tax return 114. For example, the electronic tax return 114 may include an amount of interest that the user 115 received from certain financial institutions 155, and accounts 152 at these financial institutions 150 may be identified by the allocation program 122.

At stage 535, certain embodiments may also involve the allocation program 122 identifying user accounts 152 that are available to receive at least a portion of tax refund 116 based on a source other than electronic tax return 114. For example, as shown in FIG. 6, the user 115 may also utilize a personal finance program 113 such as Quicken® or Mint. The allocation program 122 may access data of the user 115 that is stored within a file of the personal finance program 113. Thus, the personal finance program 113 may be used to acquire data of other accounts 152 or additional data related to accounts 152 that are identified or partially identified in the electronic tax return 114. The personal finance program 113 may also be linked to the computers 150 of financial institutions 155 that host accounts 152 of the user 115 and may access and manage data of the accounts 152. Thus, data from the personal finance program 113 may be utilized to supplement account data obtained from the electronic tax return 114 or to identify other possible accounts 152 that may be available to receive a portion of the refund 116.

Figure 7:
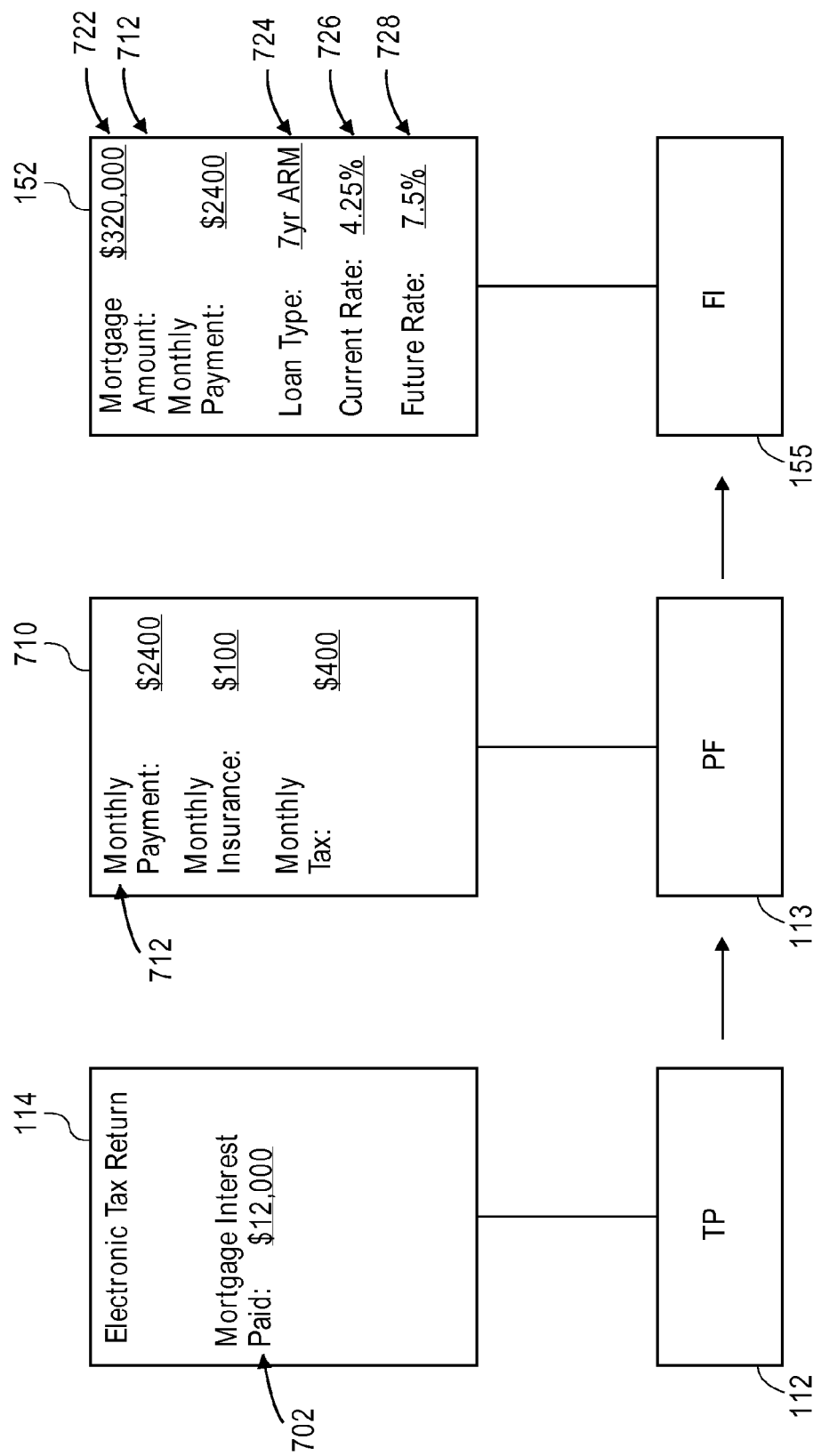
FIG. 7 illustrates how different sources of data may be accessed to determine account data according to embodiments.

For example, referring to FIG. 7, the electronic tax return 114 may include the amount of mortgage interest 702 that was paid by the user 115 during the prior tax year. The allocation program 122, upon determining that the user 115 has a mortgage based on the user 115 paying interest 702, may be configured to display additional interview screens to the user 115 (e.g., as part of the interview process during preparation of the electronic tax return 112) with additional questions about the mortgage account 152 to determine attributes such as balance of loan, interest rate, type of loan, term, etc. The user 115 may or may not know the specifics of the loan or may not have the information readily available. If the additional data is not known, or if interview screens are not utilized for this purpose, the allocation program 122 can call on the personal finance program 113 to determine whether a file of the personal finance program 113 includes any additional information about the mortgage account 152.

In the example illustrated in FIG. 7, the personal finance program 113 was utilized by the user 115 who entered mortgage account 152 information that indicates that the monthly mortgage payment 712 is $2400. A file 710 of the personal finance program 113 may also include other information related to the mortgage account 152 (e.g., interest rate, balance, loan type), but in the illustrated example, this additional information is not known at that time or was not entered by the user 115. In such cases, the allocation program 122 and/or the personal finance program 113 may request such information from the financial institutions 155 that host the accounts 152. In the illustrated example, the allocation program 122 is able to determine, through the tax preparation program 112, the personal finance program 113 and/or financial institutions 155, that the mortgage balance 722 is $320,000, the type of loan 724 is a 7 year Adjustable Rate Mortgage (ARM), the current interest rate 726 is 4.25%, and a future interest rate 728 of 7.5% when the loan adjusts after the first seven years. These data acquisition steps may be performed for each of the accounts 152 identified by the allocation program 122. It may or may not be necessary for the allocation program 122 to request additional data from the personal finance program 113 and/or financial institutions 155 depending on the availability of account 152 data.

Figure 8:
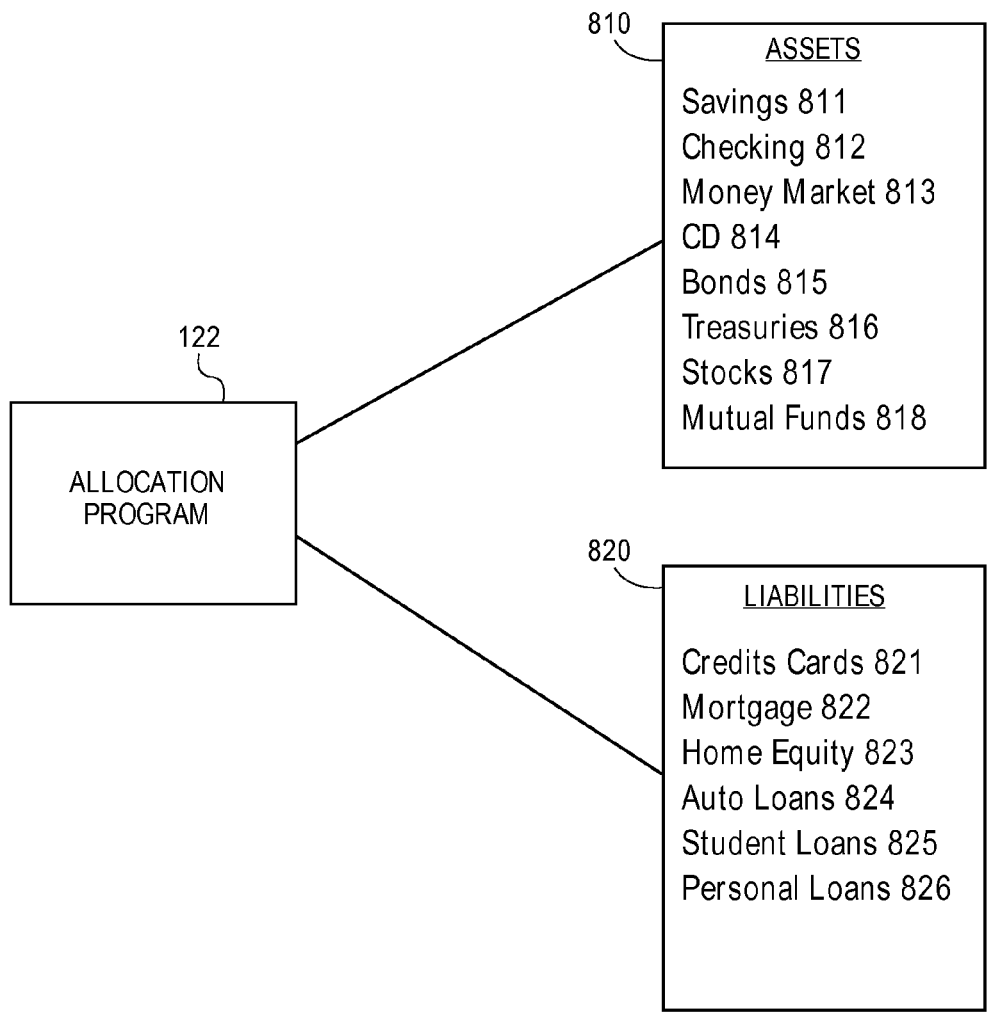
FIG. 8 illustrates types of accounts that may be considered by an allocation program according to embodiments to determine how to allocate a tax refund and deposit portions of the refund to various accounts.

Referring to FIG. 8, examples of accounts 152 that may be identified and to which at least a portion of the tax refund 116 may be applied include accounts of assets 810 and liabilities 820. Examples of assets 810 include savings 811, checking 812, money market 813 and CDs 814, bonds 815 (such as government issued I bonds and EE bonds) and treasuries 816 (such as TIPS). The tax preparation program 112 and/or the personal finance program 113 may be programmed to access this data through various user accounts 152, databases and websites. These types of assets 810 are generally considered to be low risk and stable assets. Embodiments may also identify other types of assets 810 that have a higher degree of variance and risk and that present the possibility of higher rates of returns such as stocks 817 and mutual funds 818 (e.g., if the personal finance program 113 is linked to a brokerage account 152 such that the personal finance program 113 can access current stock holdings).

Examples of liabilities 820 to which at least a portion of the tax refund 116 may be applied (e.g., to reduce debt or loan amounts of the liabilities 820) include credit cards 821 and loans such as mortgages 822, home equity 823, automobile 824, education or student 825 and personal 826 loans. In these cases, the enhanced value relative to the amount of the tax refund 116 is derived from reducing credit card or loan balances which, in turns, results in less interest paid by the user 115 over time, thereby increasing the value of the tax refund 116 relative to the amount of the tax refund 116.

Information about these types of assets 810 and liabilities 820 provided to the allocation program 122 may include balance and interest rate. The information may also indicate whether, and by what degree, aspects of an account of an asset 810 or liability 820 can change. For example, the information may include how an interest rate may change, e.g., whether a mortgage 822 is a fixed mortgage or an Adjustable Rate Mortgage (ARM) such that the rate is currently fixed for a certain time but adjusts thereafter, and whether a savings 811 or checking account 812 has a tiered interest rate structure with higher interest rates for higher balances.

Referring again to FIG. 5, at stage 540, the allocation program 122 determines options for allocating the tax refund 116 among accounts 152 selected from previously identified accounts 152 to increase value of tax refund 116 relative to the amount of the tax refund 116 as determined utilizing the tax preparation program 112. Embodiments may involve selection of one, some or all of the identified accounts 152. Accounts 152 that are selected may be selected by the user 115, by the allocation program 122 or both based criteria such as one or more or all of user 115 preferences, financial analysis and account 152 attributes such as balances, interest rates, frequency of transaction activity, etc.

Reference to increasing the value of the tax refund 116 refers to increasing the value of the tax refund 116 to the user 115 over time such that the value is greater than the base or face value of the amount of the tax refund 116. Thus, increasing the value of the tax refund 116 does not mean increasing the actual dollar amount of the tax refund 116 paid by the tax authority 135 since that amount is determined utilizing the tax preparation program 112, and the tax authority 135 will not pay more than the determined tax refund 116. Rather, increasing the value of the tax refund 116 is defined as how the tax refund 116 can be utilized, allocated or invested going forward from the date the tax refund 116 is paid in a manner that is financially beneficial to the user 110 compared to the amount of the tax refund 116 or other allocation options.

For this purpose, the allocation program 122 analyzes the various identified accounts 152 and aspects thereof (such as balances, interest rates, reward/risk and other aspects) to determine how the tax refund 116 could be allocated or apportioned among the selected accounts 152 to increase the value of the tax refund 116. As shown in FIG. 8, the allocation program 122 may consider different ways of allocating the tax refund 116 to one or more assets 810, one or more liabilities 820 or a combination thereof in order to increase the value of the tax refund 116.

According to one embodiment, the allocation program 122 is programmed to maximize the value of the tax refund 116 by depositing the tax refund 116 in the highest earning or highest potential earning account and/or a credit card 821 or loan account that charges the highest interest rate in order to enhance interest earnings, reduce interest payments, and increase the value of the tax refund 116. For example, referring to FIG. 9A, the allocation program 122 may identify a credit card account 821 that charges 20% interest and a savings account 811 that earns 1%, the allocation program 122 may be programmed, based on this criteria, to determine that an entire $1,000 tax refund 116 or a substantial portion thereof should be applied to an outstanding credit card 821 balance, with the remainder being deposited to the savings account 811 since the value of the tax refund 116 allocated in this manner can be substantially increased by not having to pay 20% interest. While this example involves selecting two accounts 152, embodiments may involve analyzing three, four, five, and other numbers of accounts 152 and allocating the tax refund 116 to three, four, five and other numbers of accounts depending on the available accounts 152, how the allocation program 122 is configured, and user 115 preferences.

Figure 9B:
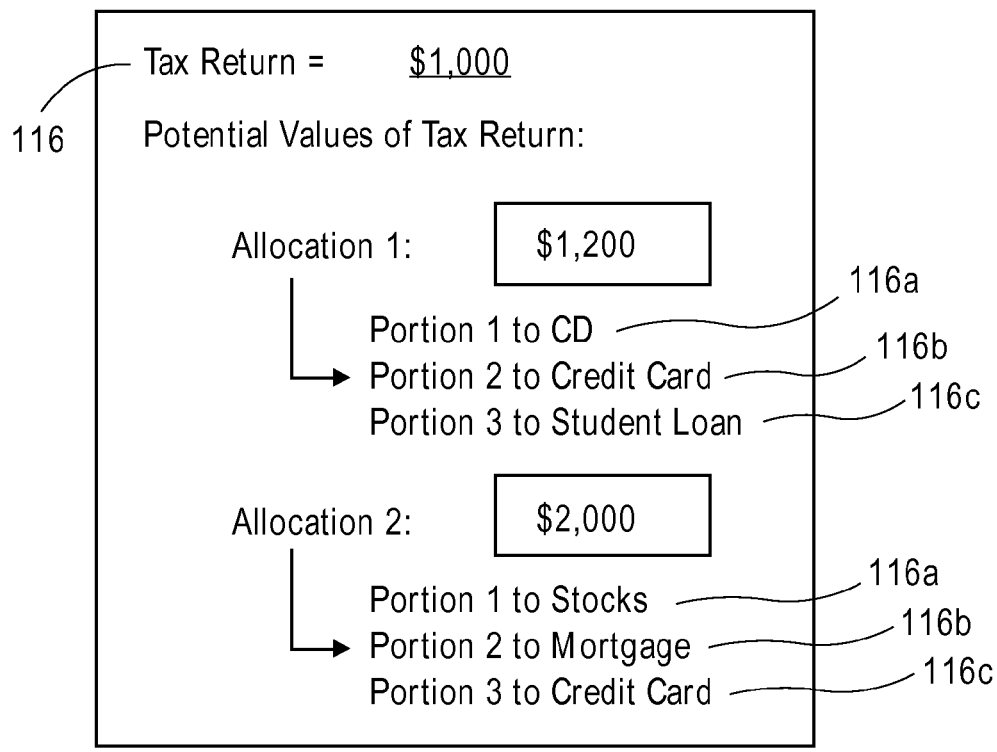

As another example, referring to FIG. 9B, the allocation program 122 may display various possible values depending on how the tax refund 116 is allocated. In the illustrated example, with a tax refund 116 in the amount of $1,000, the allocation program 122 may determine that one possible allocation would result in the value of the tax refund 116 one year from the current date being $1,200 if certain portions of the tax refund 116 were applied to a CD 814, an outstanding credit card balance 821, and an outstanding student loan balance 825, whereas the same tax refund 116 would have a value of $2,000 according to another allocation that involves certain portions of the tax refund 116 being applied to stocks 817 that the user 115 already owns (e.g., based on appreciation and/or dividend rates), a mortgage 822 and an automobile loan 824, and a value of $2,500 if the entire tax refund 116 was applied to the outstanding credit card balance 821. It should be understood that while two possible values based on two possible allocations are illustrated, embodiments may involve various other numbers of values based on other possible allocations, and the allocations may involve different numbers and types of accounts 152 and may involve different portions of the tax refund 116 being allocated to those accounts 152. Thus, FIG. 9B is provided to generally illustrate how possible values of the tax refund 116 can be displayed to the user 115.

Figure 9C:
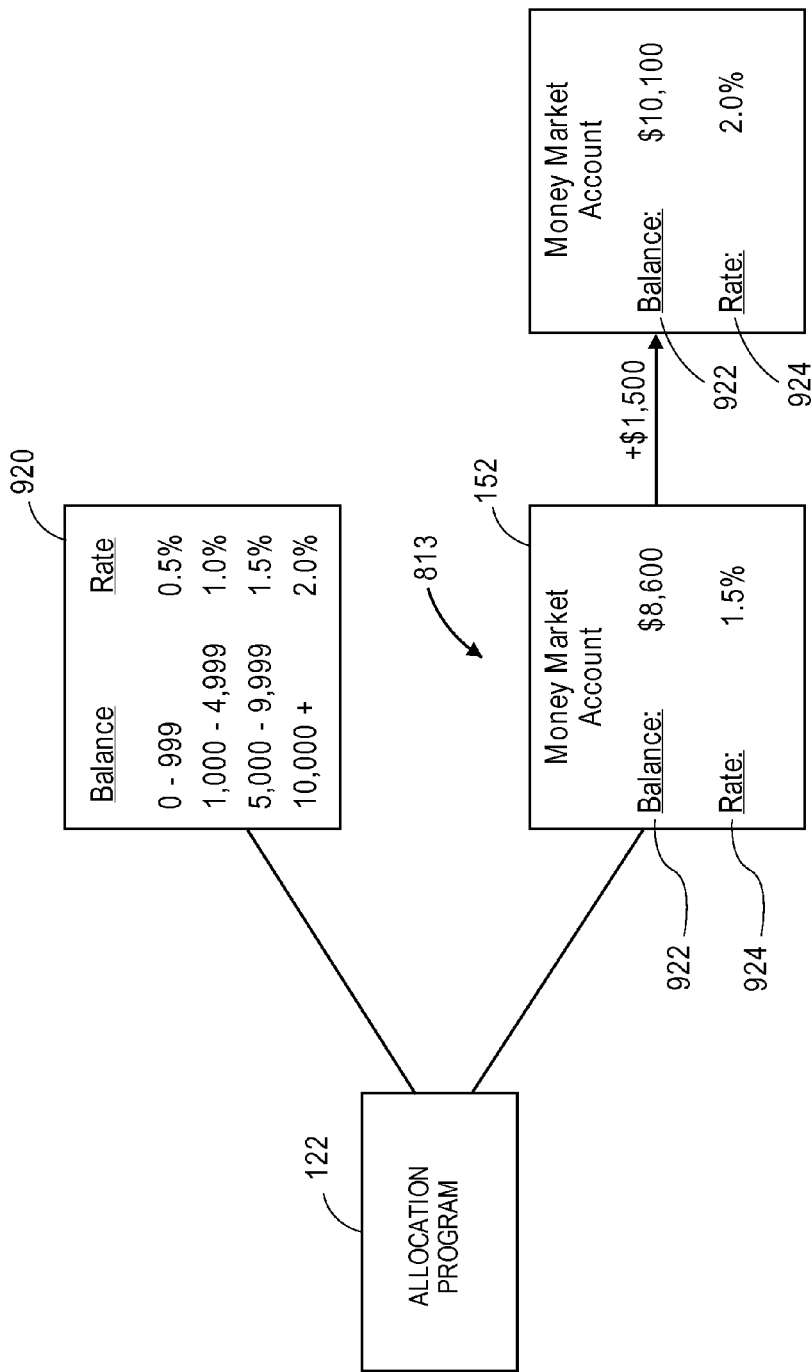

As yet another example, referring to FIG. 9C, a certain account 152 such as a money market account 813 may be selected to receive a portion or all of the tax refund since depositing part of the tax refund 116 into this account 813 may cause the balance to increase to a level that earns a higher interest rate or would increase to avoid a penalty on the account 813 (e.g., if the balance is low and subject to a penalty). For example, an interest rate table 920 may indicate that money market accounts 813 with balances of 0-$999 earn 0.5% interest, $1,000 to $4,999 earn 1.0% interest, $5,000 to $9,999 earn 1.5% interest, and balances of at least $10,000 earn 2.0% interest. The current balance 922 of the account may be $8,600 such that, according to the table 920, the user 115 currently earns interest at a rate 924 of 1.5%. The user 115 or the allocation program 122 may determine that adding $1,500 of a tax return 116 to this money market account 813 would result in the balance 922 increasing from $8,600 to $10,100 such that the user 115 would then be entitled to a higher interest rate 924 of 2%. While a money market account 813 is provided as an example of how embodiments may be implemented, this type of analysis may involve other types of accounts, and a similar analysis can be performed with respect to earning other rewards or avoiding penalties.

The user 115 may specify accounts 152 and allocation percentages and may also indicate on a scale risk/reward scale how conservative or aggressive the user 115 wants to be when trying to increase value. For example, the user 115 may specify that cash is preferred, provide input that the tax refund 116 should be conservatively allocated such that the allocation program 122 analyzes assets 810 such as savings 811, checking 812, money market 813 (rather than stocks 817 and mutual funds 818), or indicate that it is preferred to pay down debt, in which case the allocation program 122 may allocate larger portions of the tax refund 116 to liabilities 820 such as a credit card 821 or mortgage 822.

Thus, embodiments may involve the allocation program 122 seeking to maximize the value of the tax refund 116 or allocating the tax refund 116 to some or all of the identified accounts 152 in equal or different proportions or percentages.

The allocation program 122 may consider account 152 attributes and select accounts 152 based on attributes such as balance, interest rate, recent activity (e.g., since the user 115 may not want money deposited into an account 152 that is not used often), balance/interest rate tables, reward/penalties, prepayment penalties (in the case of loans) and other criteria. Allocation options can be determined by the allocation program 112 and/or user 115 and may involve two, three, four and other numbers of accounts 152, which may include different numbers of assets 810 and/or liabilities 820 at the same or different financial institutions 155.

Following selection of accounts 152 from the available identified accounts 152 and allocation analysis, at stage 545, proposed tax refund allocation options are presented or displayed to the user 115. For example, as shown in FIGS. 9A-C, the potential values 902a-c of the tax refund 116 and/or allocation options can be displayed to the user 115. Each option may be selected to display details about a proposed allocation if the details are not already provided. For example, if values are displayed, selecting a value may provide different allocation options for achieving that value.

At stage 550, if the user 115 has not yet specified an allocation, input from the user 115 related to the one or more proposed tax refund allocations is received at the intermediate computer 120. The input may confirm a proposed allocation as determined by the allocation program 122, modify a proposed allocation or delete or reject a proposed allocation. The user 115 may also reject all of the options presented by the allocation program 122 and submit his or her allocation. The final allocation can be selected or confirmed at different times, e.g., before the electronic tax return 114 is filed or before the tax refund 116 is to be allocated.

At stage 555, the tax authority 135 processes the electronic tax return 114 received from the intermediate computer 120 and at stage 560, the tax authority 135 electronically transfers the tax refund 116 to the intermediate computer 120. At stage 565, as necessary, the tax authority 135 may also send authorization 162 to the intermediate computer 120 that that tax refund 116 can be distributed to the user 115.

After receiving the tax refund 116 and authorization 162 (as necessary), the allocation program 122 is executed to transfer respective portions (116a . . . 116n) of the tax refund 116 to each selected account 152 at stage 570. For example, as shown in FIG. 1, a first portion 116a of the tax refund 116 is transferred from the intermediate computer 120 to first user account 152a, a second portion 116b of the tax refund 116 is transferred from the intermediate computer 120 to second user account 152b, and so on for additional portions and accounts 152c-152d. Embodiments may involve transferring portions of the tax refund 116 to two, three, four, five and other numbers of accounts 152, which may be the same type or different types of accounts 152 hosted by the same or different financial institutions 155.

At stage 575, confirmations 164a-d can be sent from the financial institution(s) 155 hosting the selected accounts 152 to which portions of the tax refund 116 were deposited and to the intermediate computer 120 that the deposits were received, and at stage 580, the intermediate computer 120 may send a confirmation 166 to the tax authority computer 130 that the tax refund transfers were completed.

While embodiments have been described with reference to allocation a tax refund to user accounts, embodiments may also involve the allocation program determining how to pay taxes due from various sources or accounts. System configurations described above with reference to FIGS. 1-4 may be utilized in these embodiments, but rather than determining how to allocate a refund 116 to user accounts 152, these embodiments involve determining how to allocate a tax payment or tax due 117 for payment from various accounts 152 or determining which sources of funds will be used to pay the tax due 117. Embodiments involving selecting sources of funds or allocating tax payments 117 are described with reference to FIGS. 10-11, however, details regarding aspects of embodiments including accounts 152 and allocation program are not repeated.

Figure 10:
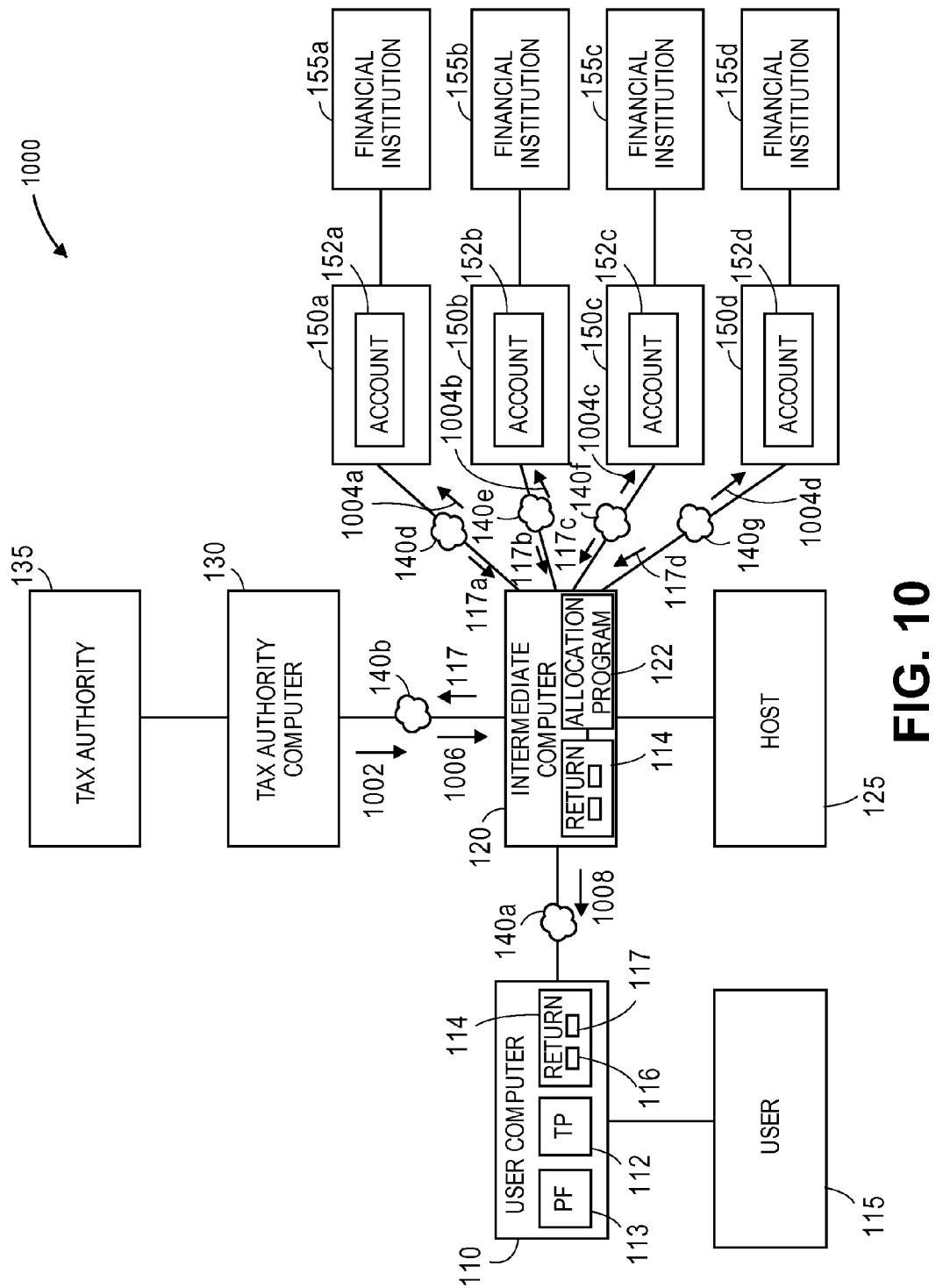
FIG. 10 illustrates one embodiment of a system configured or operable for intelligent tax payment allocation involving different accounts of different financial institutions.
Figure 11:
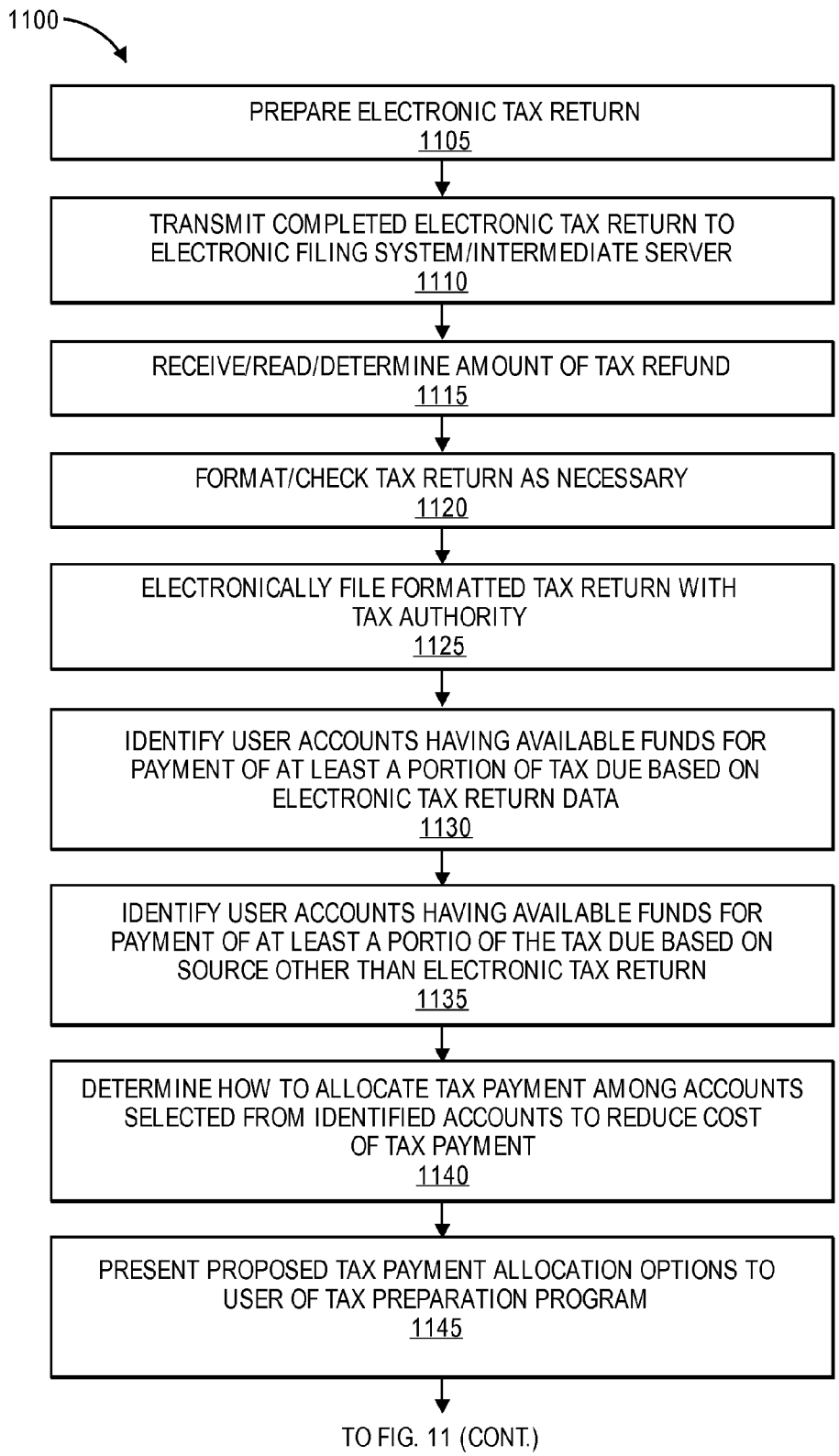
FIG. 11 is a flow diagram of one embodiment of a method for allocating a tax payment such that portions of the payment are paid from different user accounts.
Figure 11:
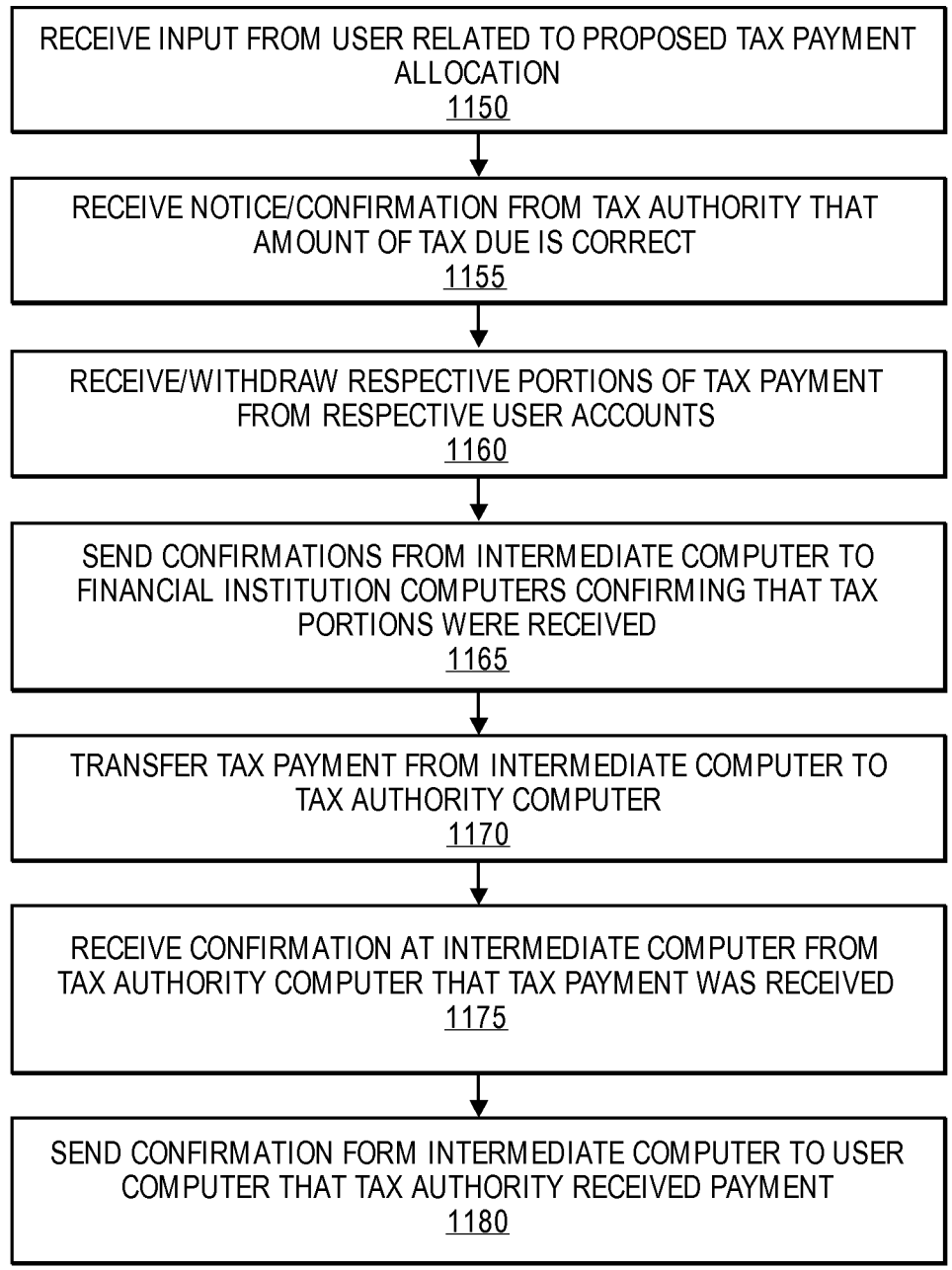

Referring to FIGS. 10-11, a method 1100, which may be implemented using system 1000 shown in FIG. 10 (and system configurations described above, e.g., as shown in FIGS. 2-4) for allocating a tax payment or tax due 117 for payment from different user accounts 152 to reduce a cost of the tax payment 117 comprises stages 1105-1125, which are the same as stages 505-525, or preparing an electronic tax return 114, transmitting the completed tax return 114 to the intermediate computer 120 such that the amount of the tax due 117 is received by the allocation program 122 or read by the allocation program 122 from the electronic tax return 114, the electronic filing system or intermediate server 120 formatting or checking the electronic tax return 114 as necessary, and electronically filing the formatted tax return 114 with the tax authority computer 130. Aspects of components of the system 1000 shown in FIG. 10 are described in detail above with reference to FIGS. 1-9 and, therefore, are not repeated.

At stage 1130, the allocation program 122 identifies user accounts 152 that have funds for payment of at least a portion of the tax due 117. The accounts 152 may be identified based on data of the electronic tax return 114. For example, the electronic tax return 114 may include an amount of interest that the user 115 received from certain financial institutions 155, and accounts 152 at these financial institutions 150 may be identified by the allocation program 122 to determine whether they have funds for payment of tax due 117.

At stage 1135, certain embodiments may also involve the allocation program 112 identifying user accounts 152 to determine whether they have funds for payment based on a source other than electronic tax return 114. For example, as described above with reference to allocation a tax refund 116, the user 115 may also utilize a personal finance program 113 such as Quicken®, Mint and other personal finance programs. The allocation program 122 may access data of the user 115 that is stored within a file of the personal finance program 113 to identify other accounts 152. Thus, the personal finance program 113 may be used to acquire data of other accounts 152 or additional data related to accounts 152 that are identified or partially identified in the electronic tax return 114. The personal finance program 113 may also be linked to the computers 150 of financial institutions 155 that host accounts 152 of the user 115 and may access and manage data of the accounts 152. Thus, data from the personal finance program 113 may be utilized to supplement account 152 data obtained from the electronic tax return 114 or to identify other possible accounts 152 that may be available for payment of at least a portion of a tax due 117.

For example, the electronic tax return 114 and/or personal finance program 113 may include data related to various assets such as savings 811, checking 812, money market 813, CD 814, bond 815, treasury 816, stock 817 and mutual fund 818 accounts and data related to various credit cards 821 and loans 822-826 that the user 115 currently has or that are available to the user 115 for payment. If the additional information is required, it can be obtained through interview screens, by checking with the personal finance program 113, or by accessing accounts 152 at financial institutions 155. These data acquisition steps may be performed for each of the accounts 152 identified by the allocation program 122. It may or may not be necessary for the allocation program 122 to request additional data from the personal finance program 113 and/or financial institutions 155 depending on the availability of account 152 data.

At stage 1140, the allocation program 122 determines options for allocating the tax payment 117 among accounts 152 selected from previously identified accounts 152 or determining accounts 152 having funds for payment of at least a portion of the tax due 117 to reduce the cost of the tax payment 117 over time. The manner in which the allocation program 122 operates for allocation of tax payments 117 to various accounts 152 is similar to the manner in which tax refunds 116 are allocated as described with reference to FIGS. 1-9 except that embodiments related to tax payments 117 involve attempting to reduce the cost of the tax payment 117 over time rather than attempting to increase the value of a tax refund 116 and thus, various details of how the allocation program 122 functions are not repeated.

For allocation of a tax payment 117, at stage 1140, the allocation program 122 determines options for allocating the tax payment 117 to be paid from funds of accounts 152 selected from previously identified accounts 152 to decrease or minimize the cost of the tax payment 117 over time. Embodiments may involve selection of one, some or all of the identified accounts 152. Accounts 152 that are selected may be selected by the user 115, by the allocation program 122 or both based criteria such as one or more or all of user 115 preferences, financial analysis and account 152 attributes such as balances, interest rates, frequency of transaction activity, etc.

Reference to reducing the cost of the tax payment 117 over time does not mean that the amount of the actual tax due 117 is reduced. Rather, reducing the cost of the tax payment 117 is defined in terms of how the tax payment 117 can be paid from user accounts 152 such that the payment is made in a financially beneficial manner compared to other payment options.

For this purpose, the allocation program 122 analyzes the various identified accounts 152 and aspects thereof (such as balances, interest rates, reward/risk and other aspects) to determine how the tax payment 117 could be allocated or apportioned among the selected accounts 152 to reduce the cost of the tax payment 117 over time. For this purpose, the allocation program 122 may consider different ways the tax refund 116 can be allocated to one or more assets 810, one or more liabilities 820 or a combination thereof (as described with reference to FIG. 8) in order to reduce the cost of the tax payment 117.

According to one embodiment, the allocation program 122 is programmed to minimize the cost of the tax payment 117 by receiving or withdrawing the tax payment 117 from the lowest earning or lowest potential earning accounts. For example, referring to FIG. 13A, the allocation program 122 may identify a savings account 811 that earns 3%, a checking account that earns 1% and a money market account 813 that earns 1.5%. In this example, the allocation program 122 may be programmed to determine that a tax payment 117 of $1,000 or a substantial portion thereof should be paid from the checking account 812 first, and if the checking account 812 does not include sufficient funds, from the money market account 113 next, followed by the savings account 811 in order to maintain higher balances in higher earning accounts such that the user 115 can earn more interest, thereby reducing the cost of the tax payment 117 compared to, for example, making the tax payment 117 from the savings account 811. While this example involves selecting three accounts 152, embodiments may involve analyzing two, four, five, and other numbers of accounts 152 and allocating the tax payment 117 to be paid from various numbers of accounts 152 depending on the available accounts 152, how the allocation program 122 is configured, and user 115 preferences.

As another example, referring to FIG. 13B, the amount of the tax payment 117 may be $1,000, and the allocation program 122 may determine that the cost of the tax payment 117 one year from the current date would be $1,200 if certain portions of the tax refund 116 were paid from a money market account 813 and a CD 814, but the cost would be $2,000 if certain portions of the tax payment were paid using a credit card 821.

As yet another example, payment from an account 152 may depend on whether the payment would cause the balance to fall to a certain level thereby resulting in a reduction of the interest rate on that account 152. For example, as discussed with reference to FIG. 9C, an interest rate table 920 may indicate that money market accounts 813 with balances up to $2,499 earn 1% interest, accounts 813 with balances of $2,500 to $9,999 earn 1.5% interest, and accounts 813 with balances greater than $10,000 earn 2% interest. The current balance 922 of the account may be $10,100. The user 115 or the allocation program 122 may determine that withdrawing $1,000 for the tax payment 117 would result in the balance falling below $10,000 such that the user 115 would then earn less interest. In these cases, the allocation program 122 may be programmed to determine whether payment can be made from other sources that do not involve an "interest penalty" due to lower balances.

Embodiments may also consider payment options from assets 180 such as stocks 816 and mutual funds 817 if the personal finance program 113 is linked to a brokerage account such that the personal finance program 113 can access current stock holdings and past performance. For example, if the allocation program 122 determines that the user 115 has a gained a certain dollar amount or percentage with a particular stock 817 and/or that the stock 817 is overbought (e.g., based on stock analysis or metrics), the allocation program 122 may select the stock account 817 for possible liquidation to pay the tax due 117. As discussed above with reference to tax refund allocation, embodiments that involve higher risk assets or investments may involve the user 115 selecting which types of other assets 810 can be considered by the allocation program 122, and the allocation program 122 may advise the user 115 that past performance of higher risk allocation options is no guarantee of future performance and that it is possible that if a stock 817 or other security is sold to pay tax due 117, the stock 817 or security price may increase (in which case the user 115 could have gained more by selling at a higher price rather than using those funds to pay the tax due 117) or decrease (in which case the user 115 received the benefit of selling at a higher price to pay the tax due 117).

Thus, embodiments may involve the allocation program 122 seeking to minimize the cost of the tax payment 117 or allocating the tax payment 117 to be paid from some or all of the identified accounts 152 in equal or different proportions or percentages. The allocation program 122 may consider account 152 attributes and select accounts 152 based on attributes such as balance, interest rate, recent activity, balance/interest rate tables, reward/penalties and other criteria. Allocation options can be determined by the allocation program 112 and/or user 115 and may involve two, three, four and other numbers of accounts 152, which may include different numbers of assets 810 and/or liabilities 820 (e.g., if the tax payment 117 is paid using a credit card 821 or loan) at the same or different financial institutions 155.

Following selection of accounts 152 from the available identified accounts 152 and analysis by the allocation program 122, at stage 1145, proposed tax payment allocation options are presented or displayed to the user 115. For example, the potential costs of the of the tax payment 117 depending on how the tax payment 117 would be paid can be displayed to the user 115. Each option may be selected to display details about a proposed payment allocation, similar to the manner in which refund allocation options and related allocation data may be displayed to users 115 as described with reference to FIGS. 9A-C.

At stage 1150, input from the user 115 related to the one or more proposed tax payment allocations is received at the intermediate computer 120. The input from the user 115 may confirm a proposed allocation as determined by the allocation program 122, modify a proposed allocation or delete or reject a proposed allocation. The user 115 may also reject all of the options presented by the allocation program 122 and submit his or her allocation.

The tax authority 135 processes the electronic tax return 114 received from the intermediate computer 120 and at stage 1155, the tax authority 135 sends a notice or confirmation 1002 to the intermediate computer 120 that the amount of the tax payment 117 is correct and that the tax payment 117 can be paid from respective accounts 152 selected by the allocation program 122 and/or user 115.

After receiving the tax payment 117 due and authorization 1002 (as necessary), the allocation program 122 is executed to withdraw, transfer or receive respective portions of the tax payment 117 from each selected account 152 at stage 1160. For example, as shown in FIG. 10, a first portion 117a of the tax payment 117 is withdrawn by the intermediate computer 120 from a first user account 152a, a second portion 117b of the tax payment 117 is withdrawn by the intermediate computer 120 from a second user account 152b, a third portion 117c is withdrawn from a third user account 152c, and a fourth portion 117d is withdrawn from a fourth user account 152d. Embodiments may involve transferring portions of the tax payment 117 from two, three, four, five and other numbers of accounts 152, which may be the same type or different types of accounts 152 hosted by the same or different financial institutions 155.

At stage 1165, after receipt of all of the payment portions 117a-d, the confirmations 1004a-d can be sent from the intermediate computer 120 to financial institution(s) 155a-d hosting the selected accounts 152a-d from which portions 117a-d of the tax payment 117 were withdrawn. At stage 1170, the intermediate computer 120 may then transfer the tax payment 117 to the tax authority 135. At stage 1175, the intermediate computer 120 may receive a confirmation 1006 from the tax authority computer 130 that the tax payment 117 was received, and the intermediate computer 120 may then send a confirmation 1008 to the user computer 110 at stage 1180 that the tax authority received the payment 117.

Figure 12:
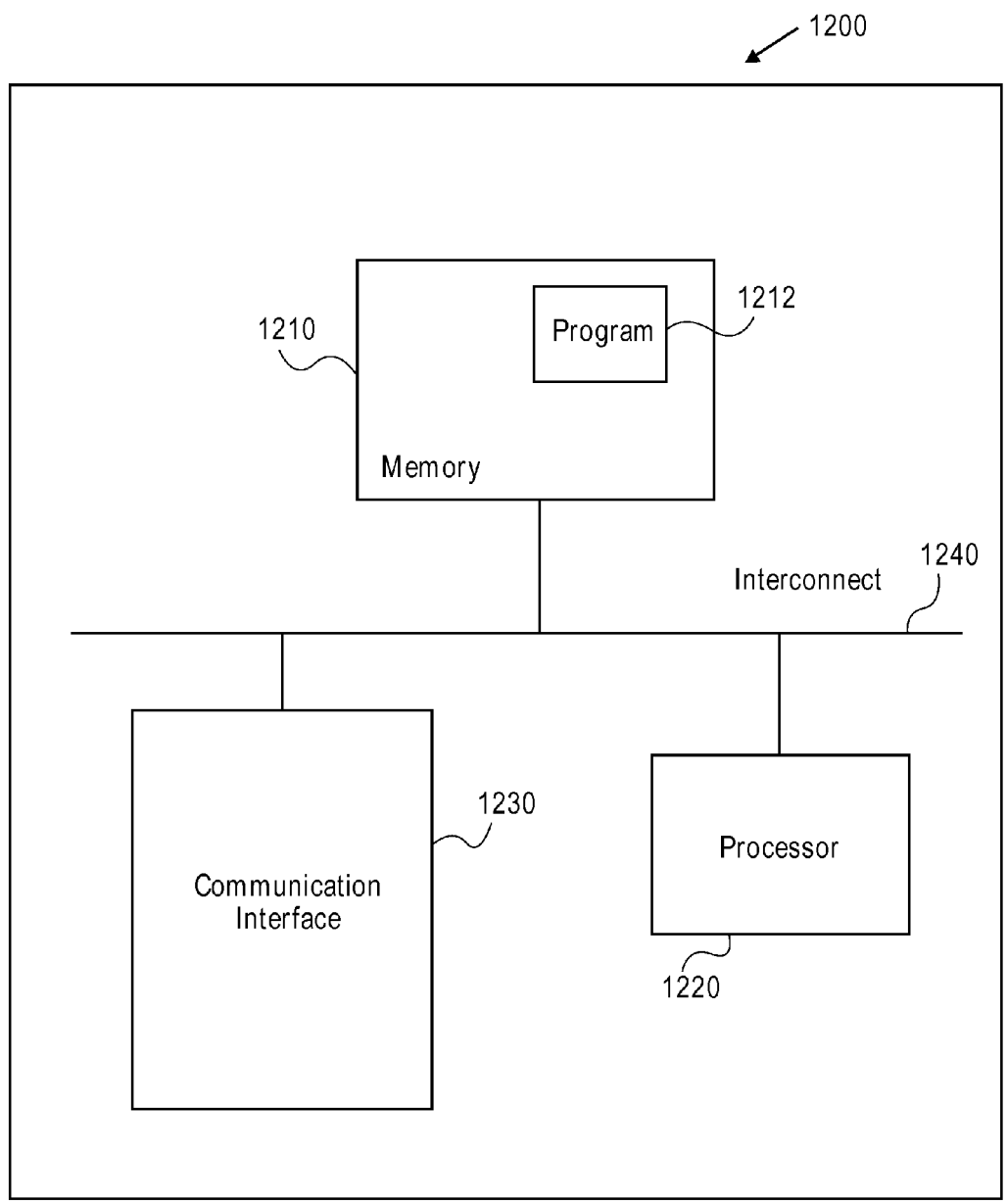
FIG. 12 is a system diagram of components of a computing apparatus that may be utilized by various system components.

FIG. 12 generally illustrates computing components that may be included in various system components to implement embodiments. A computing apparatus 1200 may include a memory 1410, program instructions 1212, a processor or controller 1220, a network or communications interface 1230, and connections or interconnect 1240 between such components. For example, the memory 1210 may be or include one or more of cache, RAM, ROM, SRAM, DRAM, RDRAM, EEPROM and other types of memory. The processor unit 1220 may be or include multiple processors, a single threaded processor, a multi-threaded processor, a multi-core processor, or other type of processor. Depending on the particular system component (e.g., whether the component is a computer or a hand held mobile communications device), the interconnect 1240 may include a system bus, LDT, PCI, ISA, or other types of buses, and the communications or network interface may, for example, be an Ethernet interface, a Frame Relay interface, or other interface. The network interface 1430 may be configured to enable a system component to communicate with other system components across a network 140 which, as explained above, may be a wireless or various other networks. Accordingly, the system configuration provided in FIG. 12 is provided for ease of explanation and illustration to generally illustrate system components that may be utilized in various embodiments.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magnetooptical storage medium. Examples of carriers include, but are not limited to, a floppy diskette, a memory stick or a flash drive, CD-R, CD-RW, CD-ROM, DVD-R, and DVD-RW. The processor 1220 performs steps or executes program instructions 1212 within memory 1210 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Various changes and modifications may be made without departing from the scope of the claims.

For example, although certain embodiments are described with reference to individual tax returns, embodiments can also be applied to preparation of business or corporate tax returns. Further, embodiments may involve analysis of available user accounts and allocations determined by the user, by the allocation program or both. Tax refund allocations may involve only asset accounts (to earn interest), only liability accounts (to pay of debt and avoid paying interest) or a combination thereof and different numbers and types thereof at the same or different financial institutions. Tax payment allocations may involve only asset accounts (having funds for payment), only liability accounts (e.g., paying tax by credit card or a loan) or a combination thereof and different numbers and types thereof at the same or different financial institutions.

Moreover, while embodiments are described with reference to maximizing or increasing the value of a tax refund and minimizing or reducing the cost of a tax payment over time, it should be understood that embodiments may involve allocations across the spectrum, particularly when the user is involved in providing input regarding allocation. For example, in the case of a tax refund, the allocation may be based on user preferences for maximizing the value, minimizing cash, maximizing cash, minimizing interest paid on a credit card, etc. Thus, even in cases in which the tax refund is provided as a cash payment to the user, the user is presented with different allocation options so that the user understands and appreciates how that money could be used such that the user appreciates the value of the cash and cost of purchases using that cash (e.g., purchasing a new car versus paying off a portion of a mortgage, which could result in substantial interest savings). In the case of a tax payment, the allocation may be based on user preferences for minimizing the cost, maintaining cash reserves in certain accounts, minimizing losses of interest by not paying tax from certain accounts, etc.

Additionally, in certain embodiments, the intermediate server that performs electronic tax return formatting and filing is the same return that performs allocation, but in other embodiments, different intermediate computers may perform these different functions. However, in both cases, in contrast to known systems involving direct communications between a tax authority and a user, embodiments involve tax refunds that are intercepted or routed through an intermediate computer, and tax payments are made or routed through an intermediate computer.

Also, where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method of processing a tax refund, the method comprising:

an intermediate computer in communication with a computer of a tax authority and a computer of a user of a tax preparation program through respective networks accessing an electronic tax return prepared by execution of the tax preparation program to receive or determine an amount of the tax refund;

the intermediate computer identifying accounts of the user that are available to receive at least a portion of the tax refund;

the intermediate computer determining an allocation of the tax refund among selected accounts of the identified accounts to increase a value of the tax refund relative to the amount of the tax refund, at least one account being selected when the account satisfies pre-determined balance criteria comprising a balance of the at least one account increasing when at least a portion of the tax refund is transferred to the at least one account according to the determined allocation to cause an interest rate of the at least one account to increase from a first interest rate to a second interest rate;

the intermediate computer receiving the tax refund at the intermediate computer from the computer of the tax authority, wherein the tax refund is not directly deposited by the tax authority into an account of the user; and the intermediate computer transferring respective portions of the tax refund to respective selected accounts based at least in part upon the determined allocation.

2. The method of claim 1, the selected accounts comprising a first account at a first financial institution and a second account at a second financial institution.

3. The method of claim 1, the selected accounts comprising a first account of a first type and a second account of a second type.

4. The method of claim 3, at least one of the first account and the second account comprising an account of a loan or a credit card.

5. The method of claim 3, at least one of the first account and the second account comprising a checking account other than a checking account identified in the electronic tax return.

6. The method of claim 1, further comprising receiving an authorization from the computer of the tax authority at the intermediate computer, the authorization indicating that the respective portions of the tax refund can be transferred from the intermediate computer to respective selected accounts.

7. The method of claim 1, further comprising:
   formatting the electronic tax return generated by the tax preparation program; and
   electronically filing the formatted electronic tax return by transmitting the formatted electronic tax return from the intermediate computer to the computer of the tax authority.

8. The method of claim 1, the intermediate computer from which the respective portions of the tax refund are transferred to respective selected accounts comprising a computer other than a computer that is utilized to format the electronic tax return generated by the tax preparation program and electronically file the formatted electronic tax return by transmitting the formatted electronic tax return to the computer of the tax authority.

9. The method of claim 1, the tax preparation program being executed to determine the amount of the tax refund, identify available accounts, determine how to allocate the tax refund among selected accounts, and transfer respective portions of the tax refund from the intermediate computer to respective selected accounts.

10. The method of claim 1, all available accounts being selected.

11. The method of claim 1, at least one available account not being selected.

12. The method of claim 1, an account being selected by the tax preparation program.

13. The method of claim 1, an account being selected by the user of the tax preparation program.

14. The method of claim 1, the pre-determined criteria further comprising an interest rate of the account, an account being selected to receive at least a portion of the tax refund when the interest rate is greater than a pre-determined interest rate.

15. The method of claim 1, the pre-determined criteria comprising a penalty or reward associated with the account, wherein the account is selected to receive at least a portion of the tax refund when transferring at least the portion of the tax refund to the account would prevent or reduce the penalty or qualify the user for the reward.

16. The method of claim 1, further comprising determining whether the amount of the tax refund is greater than a pre-determined amount, the tax refund being allocated and respective portions of the tax refund being transferred to respective selected accounts when the amount of the tax refund is greater than the pre-determined amount.

17. The method of claim 1, further comprising receiving financial data from a source external to the electronic tax return, the allocation of the tax refund being based at least in part upon data of the electronic tax return and financial data from the source.

18. The method of claim 1, prior to transferring respective portions of the tax refund from the intermediate computer to respective selected accounts, the method further comprising
   displaying the identified available accounts to the user of the tax preparation program; and
   receiving input from the user, the input indicating which accounts are to be included in the tax refund allocation determination.

19. The method of claim 1, prior to transferring respective portions of the tax refund to respective selected accounts, the method further comprising:
   displaying tax refund allocation options to the user of the tax preparation program; and
   receiving input from the user, the input selecting at least one tax refund allocation, wherein respective portions of the tax refund are transferred from the intermediate computer to respective selected accounts based at least in part upon the selected tax refund allocation option.

20. The method of claim 19, the tax refund allocation options comprising respective values of respective tax refund allocations.

21. The method of claim 1, determining how to allocate the tax refund being performed by the tax preparation program.

22. The method of claim 1, determining how to allocate the tax refund being based at least in part upon a first input and a second input by the user, the first input specifying portions of the tax refund, and the second input specifying accounts into which respective portions of the tax refund are to be transferred.

23. The method of claim 1, the determined allocation increasing the value of the tax refund by depositing at least a portion of the tax refund into an account earning more interest than at least one other account.

24. The method of claim 4, the determined allocation increasing the value of the tax refund by reducing a balance on the loan or the credit card.

25. The method of claim 1, at least three accounts being selected, respective portions of the tax refund being transferred from the intermediate computer to the at least three selected accounts.

26. The method of claim 25, a first portion of the tax refund being transferred to a selected credit card account, a second portion of the tax refund being transferred to a selected mortgage account, and a third portion of the tax refund being transferred to a selected savings or checking account.

27. The method of claim 1, the intermediate computer hosting the tax preparation program and electronically filing the electronic tax return with a computer of the tax authority.

* * * * *